(12) United States Patent
Ono et al.

(10) Patent No.: US 10,472,724 B2
(45) Date of Patent: Nov. 12, 2019

(54) CHEMICAL REACTION DEVICE

(71) Applicant: KABUSHIKI KAISHA TOSHIBA, Tokyo (JP)

(72) Inventors: Akihiko Ono, Tokyo (JP); Satoshi Mikoshiba, Yamato (JP); Yuki Kudo, Yokohama (JP); Ryota Kitagawa, Tokyo (JP); Jun Tamura, Tokyo (JP); Chingchun Huang, Tokyo (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 0 days.

(21) Appl. No.: 16/256,630

(22) Filed: Jan. 24, 2019

(65) Prior Publication Data

US 2019/0169760 A1   Jun. 6, 2019

Related U.S. Application Data

(60) Division of application No. 15/066,272, filed on Mar. 10, 2016, now abandoned, which is a continuation of
(Continued)

(30) Foreign Application Priority Data

Sep. 17, 2013   (JP) .................. 2013-192115

(51) Int. Cl.
| | |
|---|---|
| *C25B 1/00* | (2006.01) |
| *C25B 1/04* | (2006.01) |
| *C25B 3/04* | (2006.01) |
| *C25B 15/02* | (2006.01) |
| *H01G 9/20* | (2006.01) |

(52) U.S. Cl.
CPC ............... *C25B 15/02* (2013.01); *C25B 1/00* (2013.01); *C25B 1/003* (2013.01); *C25B 1/04* (2013.01); *C25B 3/04* (2013.01); *H01G 9/20* (2013.01); *Y02E 60/366* (2013.01); *Y02E 70/10* (2013.01)

(58) Field of Classification Search
CPC .. C25B 1/00; C25B 1/003; C25B 1/04; C25B 3/04; C25B 15/02; H01G 9/20; Y02E 60/366; Y02E 70/10
See application file for complete search history.

(56) References Cited

U.S. PATENT DOCUMENTS

| | | | |
|---|---|---|---|
| 2009/0000574 | A1 | 1/2009 | Sugimasa et al. |
| 2010/0133110 | A1 | 6/2010 | Nocera |

(Continued)

FOREIGN PATENT DOCUMENTS

| | | |
|---|---|---|
| JP | 10-290017 | 10/1998 |
| JP | 3108079 | 11/2000 |

(Continued)

OTHER PUBLICATIONS

G.H. Lin et al., "One step method to produce hydrogen by a triple stack amorphous silicon solar cell" Appl. Phys. Lett, vol. 55, No. 4, 386-387 (Jul. 24, 1989).

(Continued)

*Primary Examiner* — Ciel P Thomas
(74) *Attorney, Agent, or Firm* — Oblon, McClelland, Maier & Neustadt, L.L.P.

(57) ABSTRACT

Disclosed here is a method of operating a chemical reaction device that includes the steps of determining the presence of surplus power more than a demand, and determining the presence of solar energy.

9 Claims, 21 Drawing Sheets

Related U.S. Application Data application No. PCT/JP2014/071407, filed on Aug. 13, 2014.

(56) References Cited

U.S. PATENT DOCUMENTS

| | | |
|---|---|---|
| 2012/0216759 A1 | 8/2012 | Irvin |
| 2013/0008775 A1 | 1/2013 | Ahmed |
| 2013/0068296 A1 | 3/2013 | Yoshida et al. |
| 2015/0252483 A1 | 9/2015 | Ono et al. |

FOREIGN PATENT DOCUMENTS

| | | |
|---|---|---|
| JP | 2005-133174 | 5/2005 |
| JP | 2006-265697 | 10/2006 |
| JP | 2008-218315 | 9/2008 |
| JP | 2009-007647 | 1/2009 |
| JP | 2010-163678 | 7/2010 |
| JP | 2011-094194 | 5/2011 |
| JP | 2012-1420 A | 1/2012 |
| JP | 2014-101550 A | 6/2014 |
| JP | 2014-101551 | 6/2014 |
| JP | 2014-175245 A | 9/2014 |
| WO | 2011/145406 | 11/2011 |
| WO | 2013/073271 | 5/2013 |
| WO | 2014/080774 | 5/2014 |

OTHER PUBLICATIONS

S.Y. Reece et al., "Wireless solar Water Splitting Using Silicon-Based Semiconductors and Earth-Abundant Catalysts", Science vol. 334, No. 4, pp. 645-648 (Nov. 2011).

B.A. Rosen et al., "Ionic Liquid-Mediated Selective Conversion of $CO_2$ to CO at Low Overpotentials", Science vol. 334, pp. 643-644 (Nov. 2011).

Office Action dated Jul. 27, 2015, in corresponding Taiwanese application No. 103128810 with English translation.

International Search Report dated Oct. 28, 2014 in PCT/JP2014/071407 filed Aug. 13, 2014.

Office Action dated Jun. 15, 2016 in Korean Patent Application No. 10-2015-7022689 (with unedited computer generated English language translation).

Eric Miller, et al., "Photoelectrochemical Hydrogen Production", Proceedings of the 2001 DOE Hydrogen Program Review, 2001, 23 Pages.

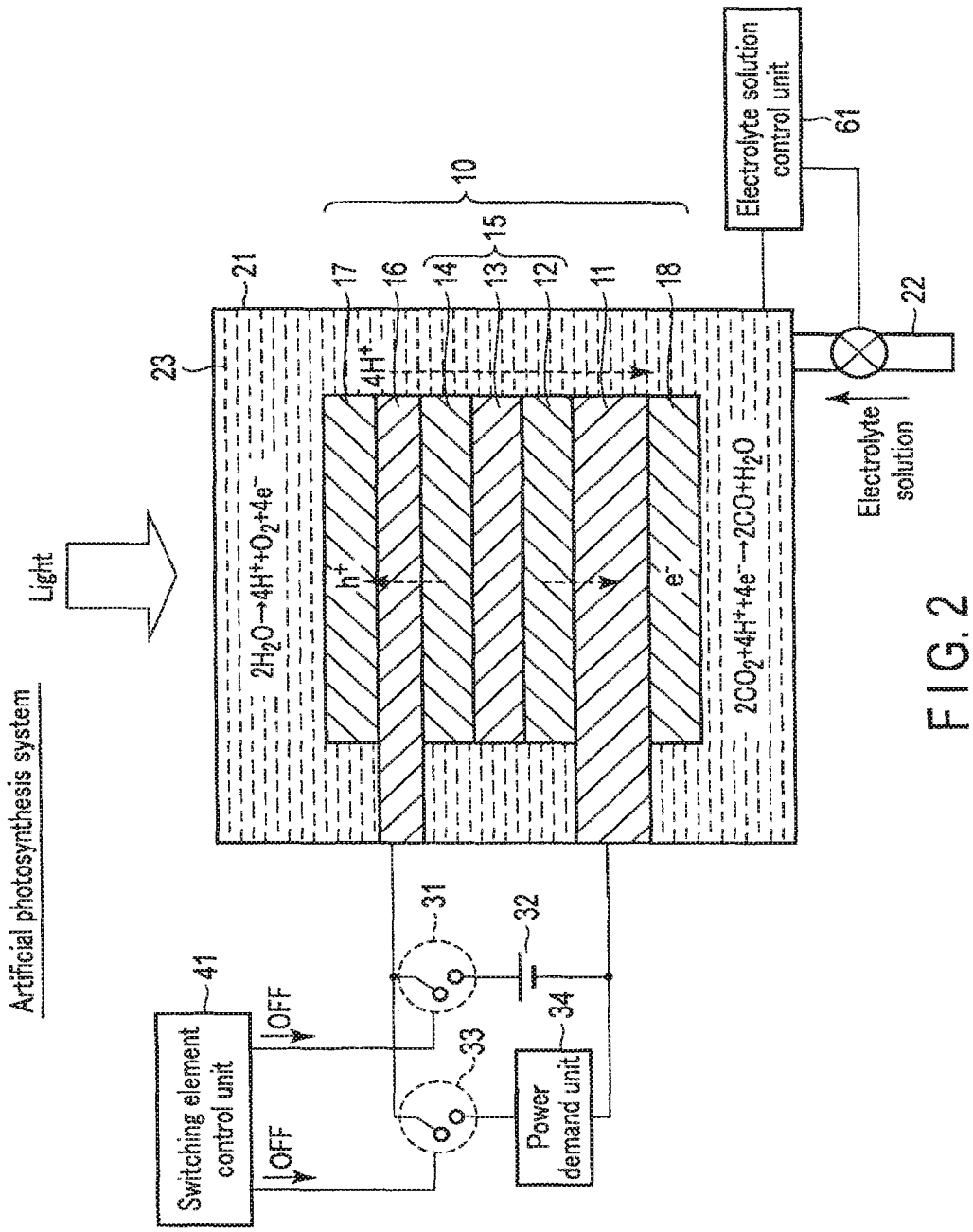
F I G. 2

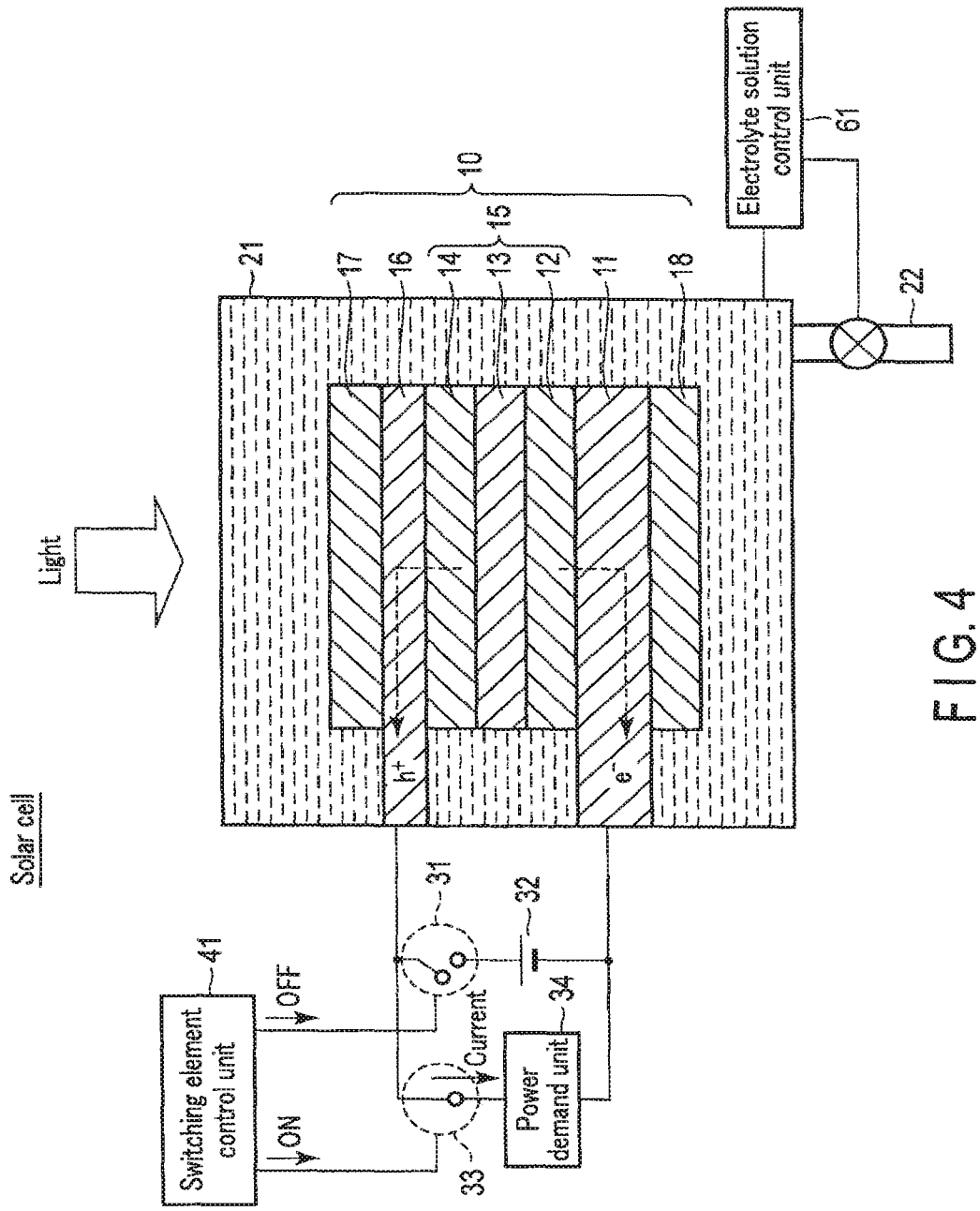
F I G. 4

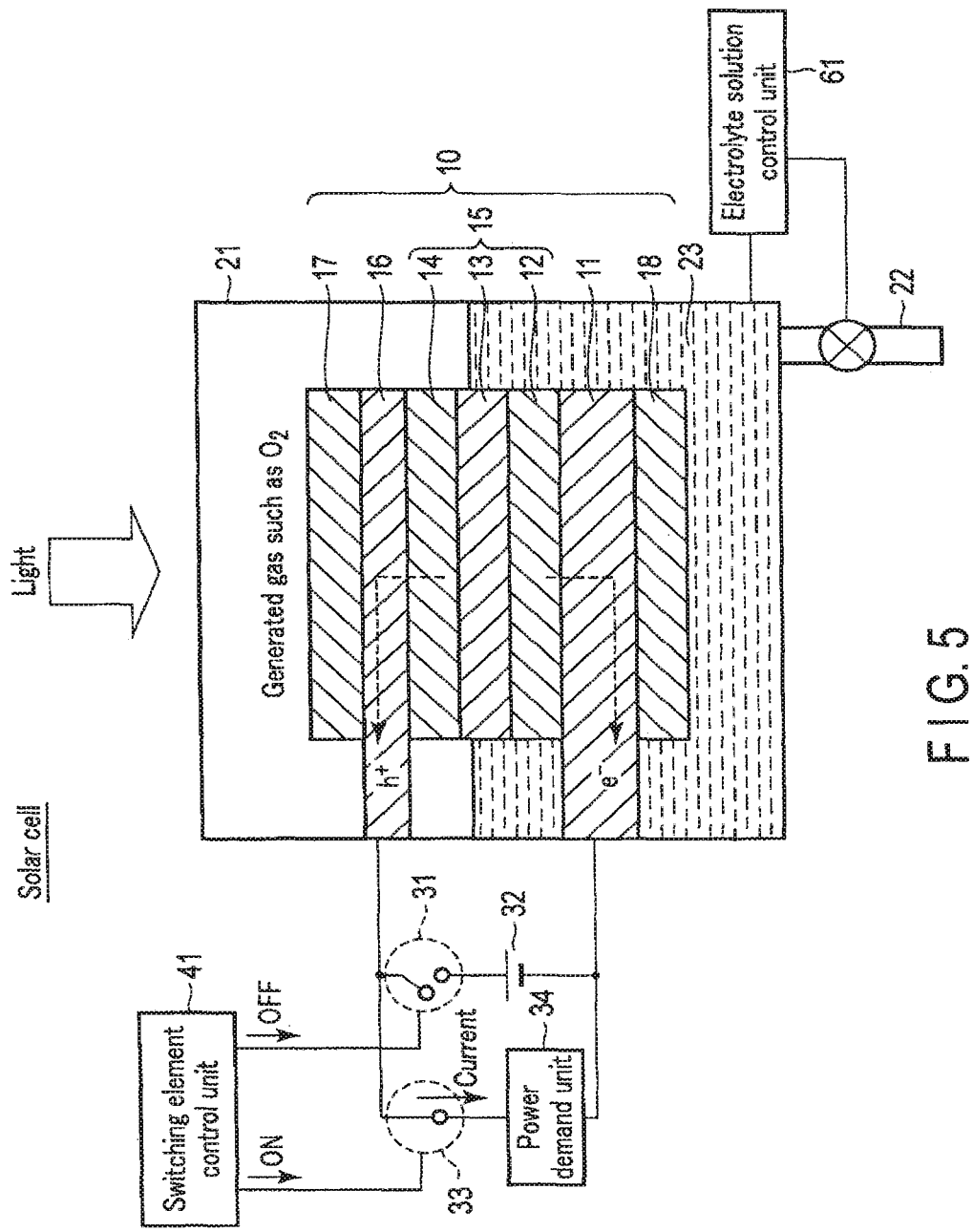
F I G. 5

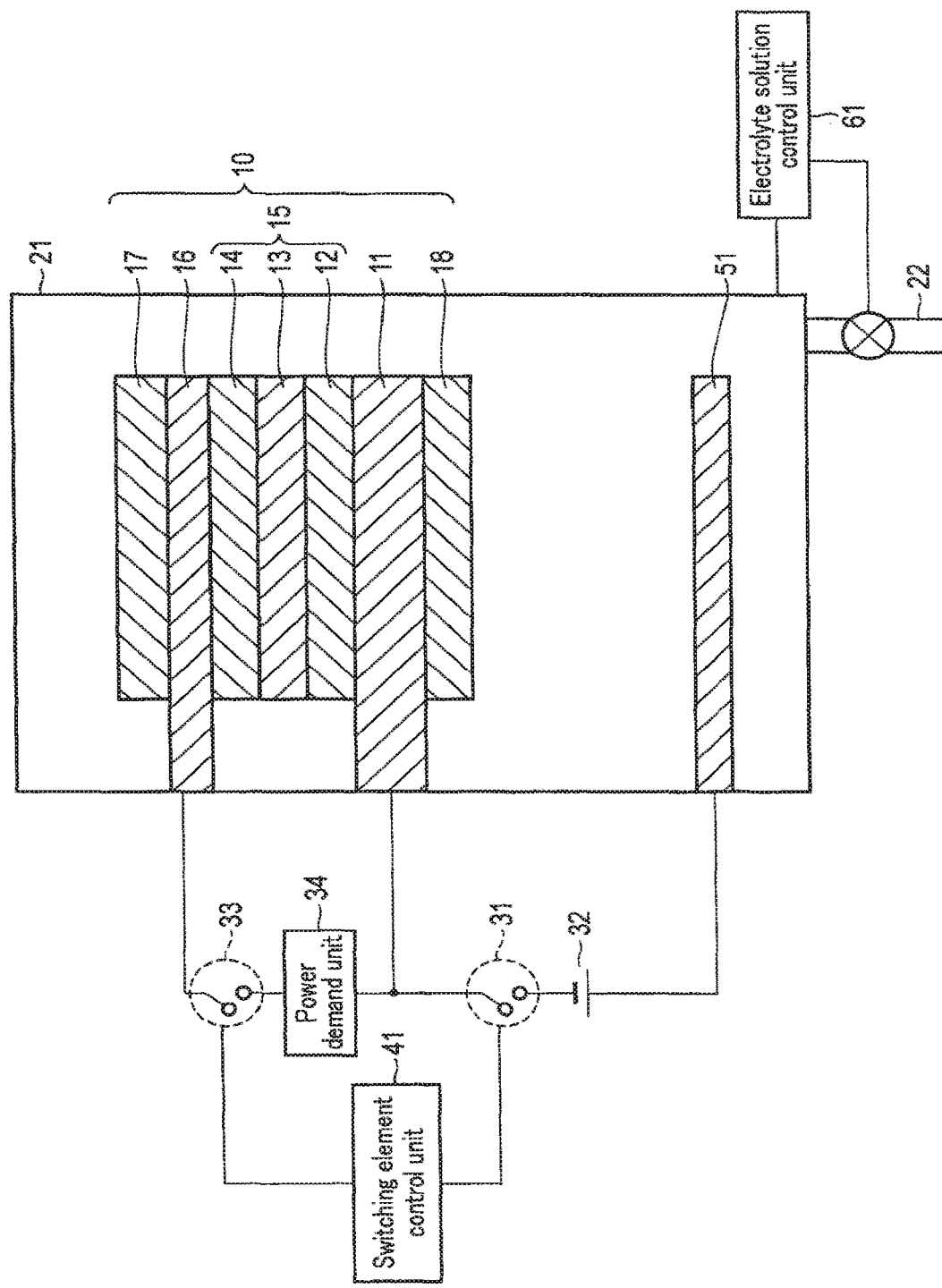
F I G. 9

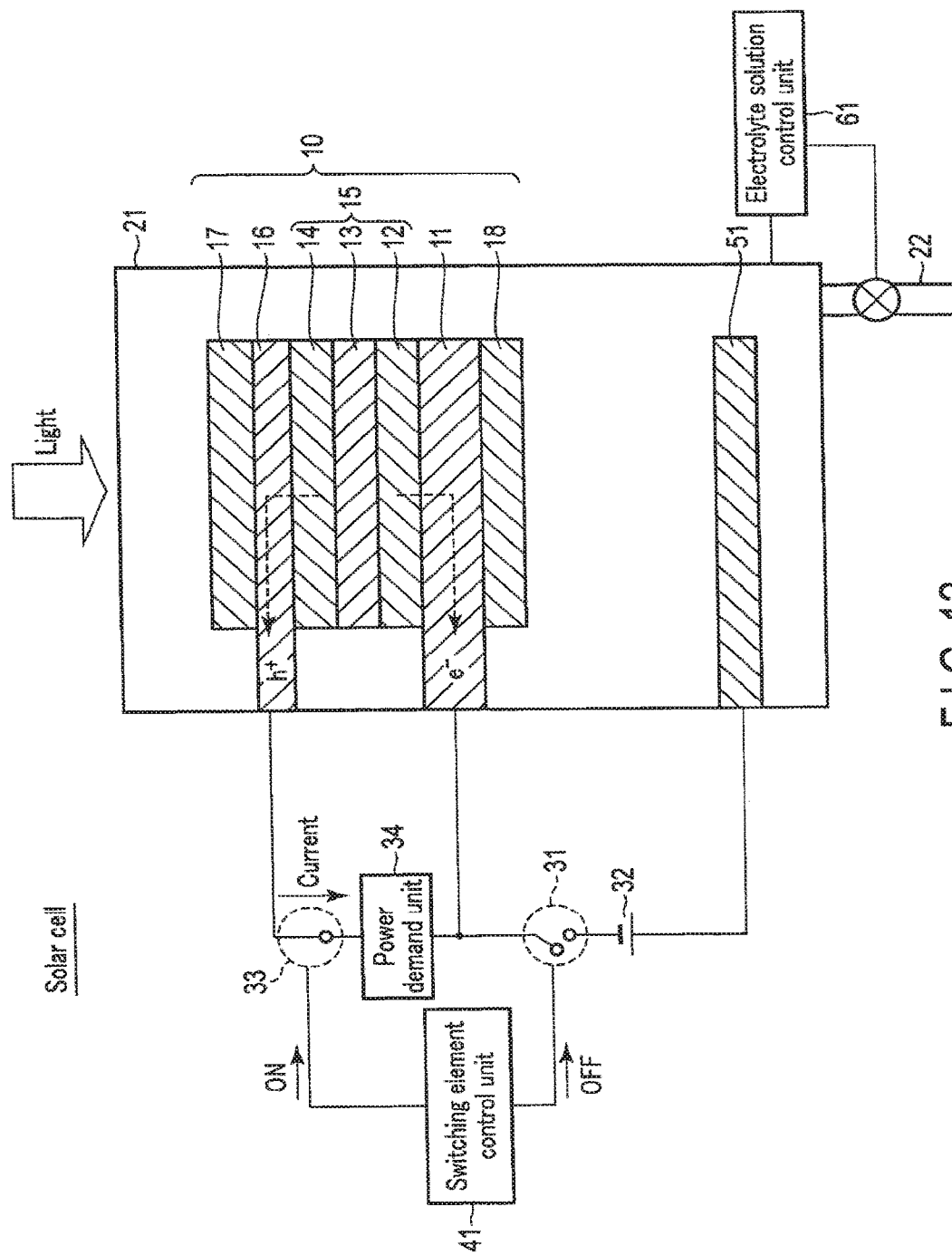
F I G. 12

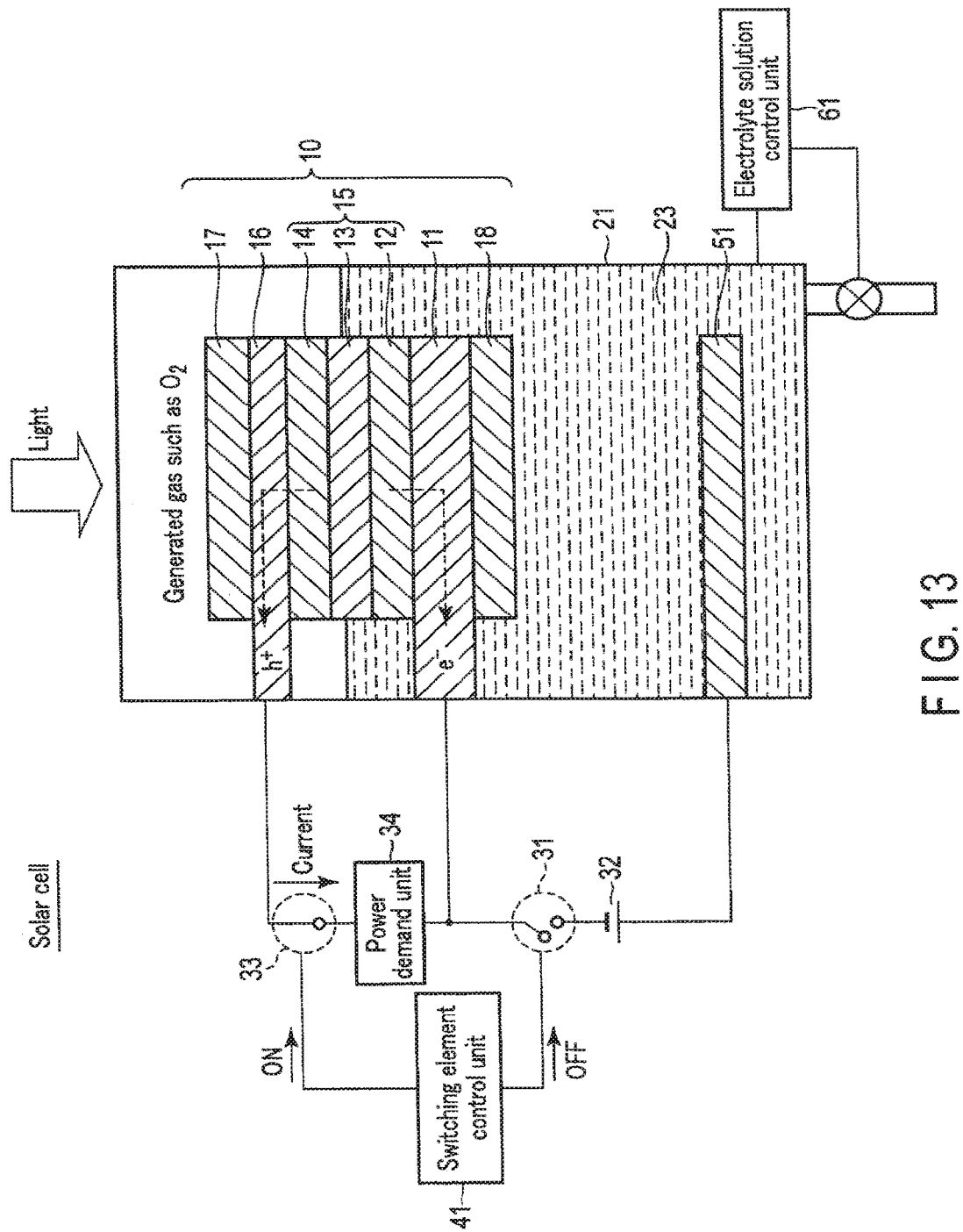
F I G. 13

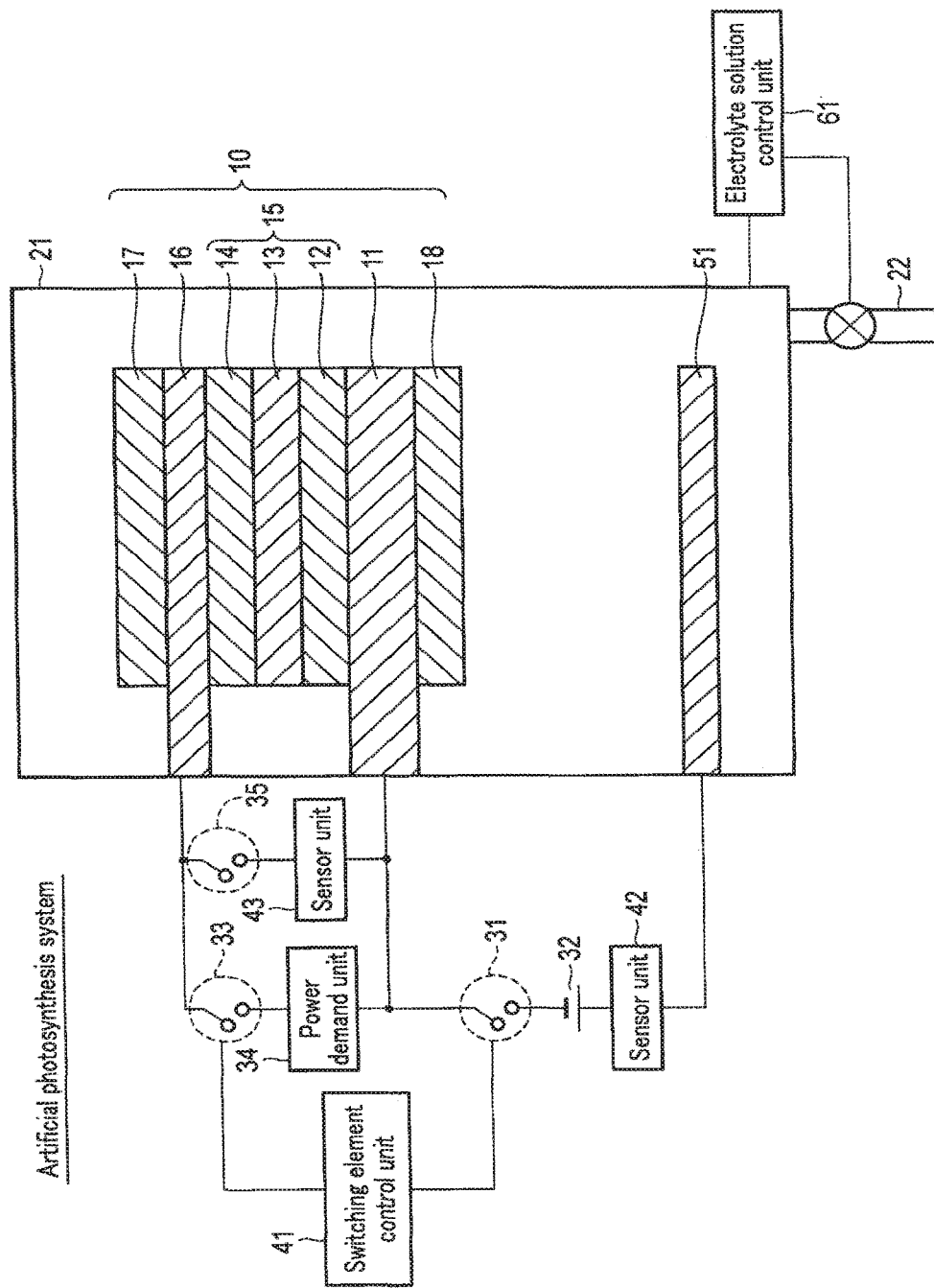
F I G. 15

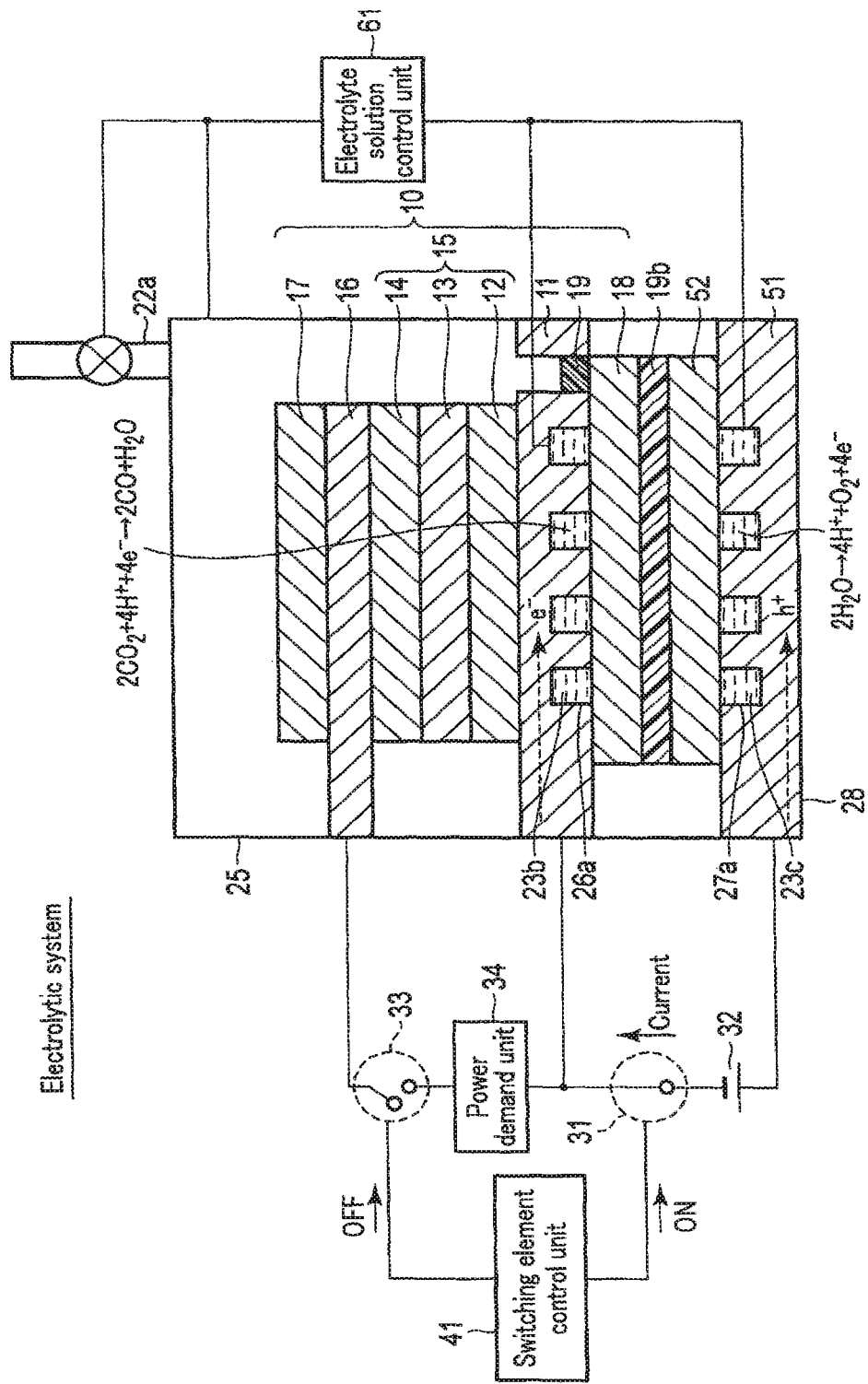
F I G. 18

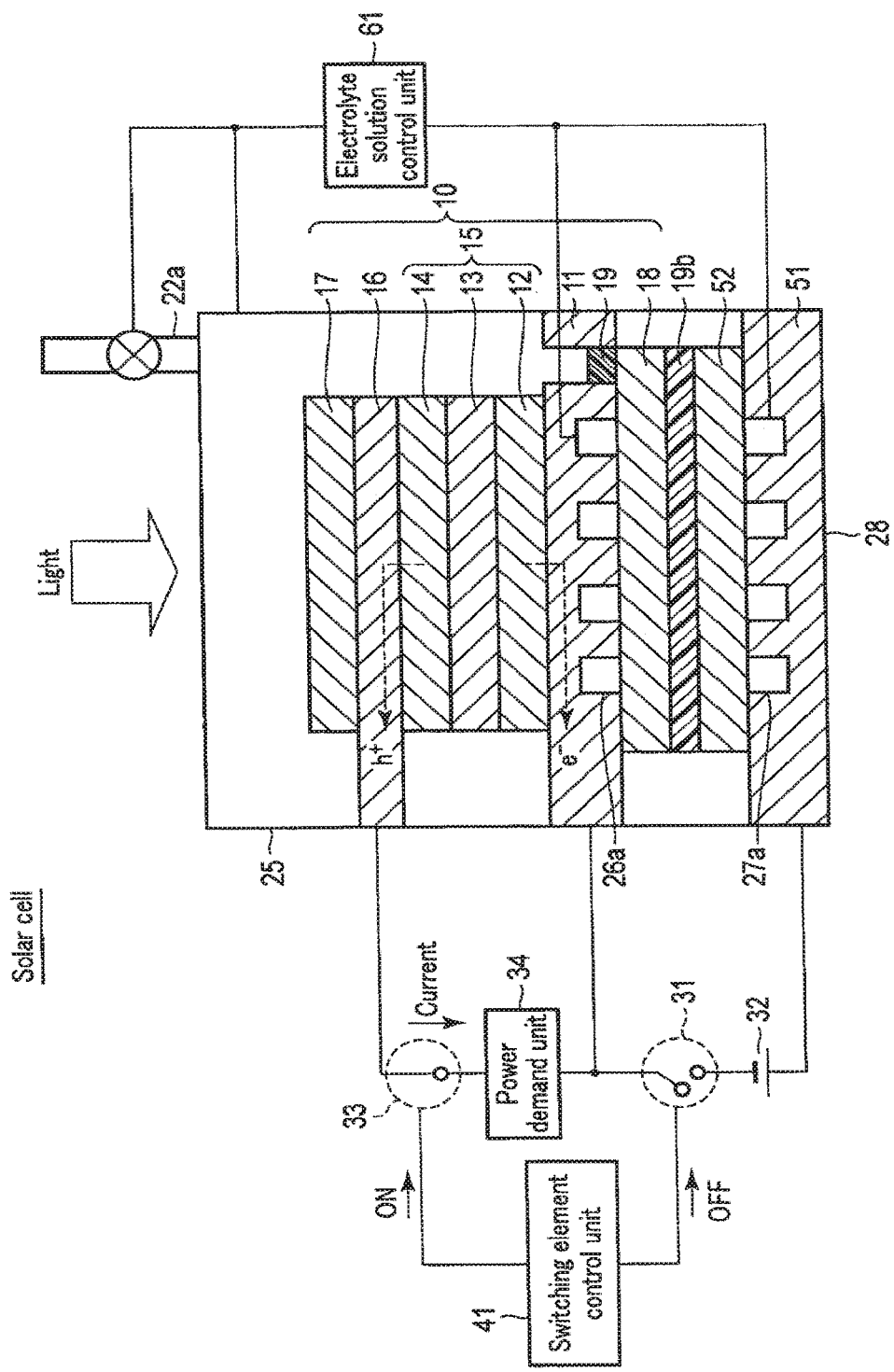
F I G. 19

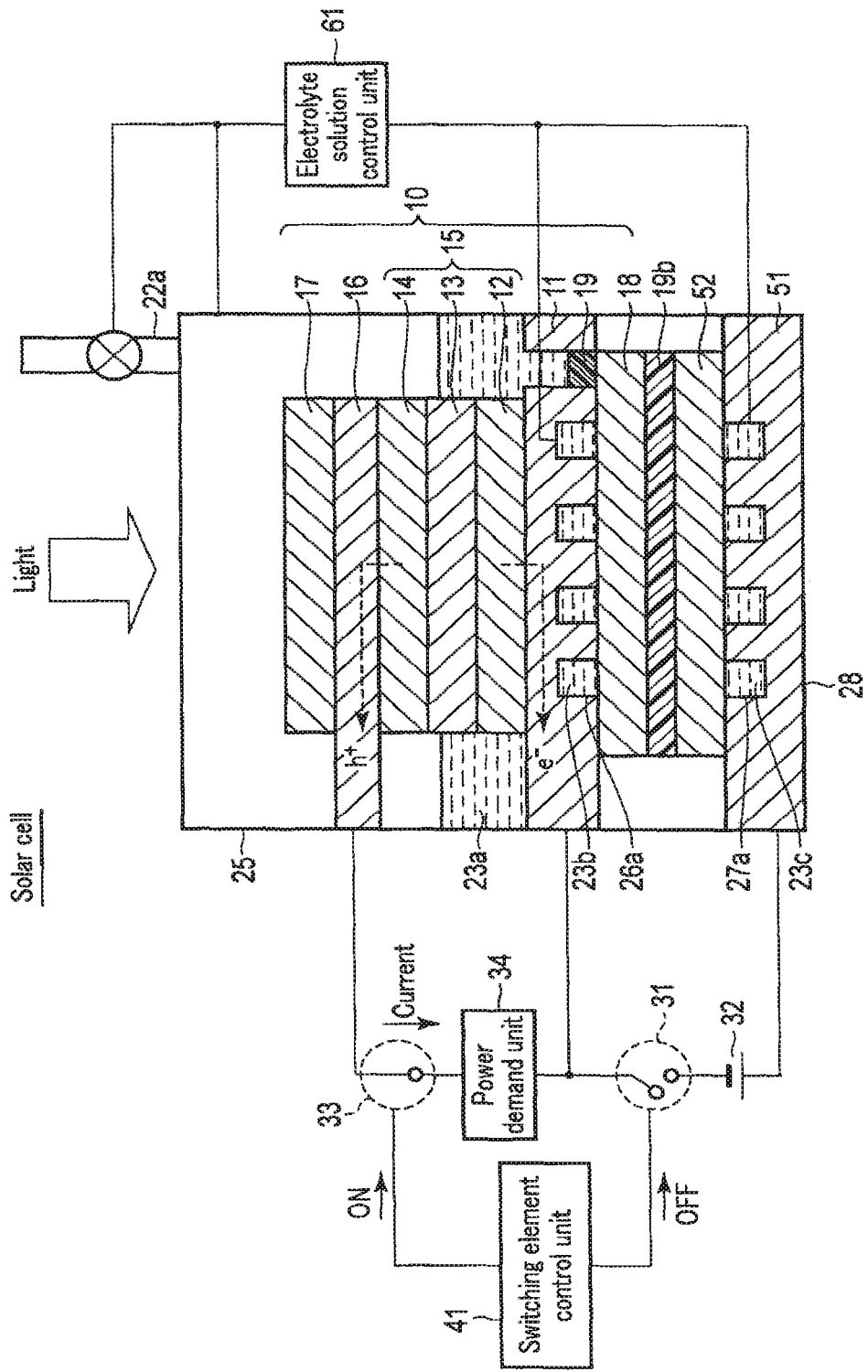
F I G. 20

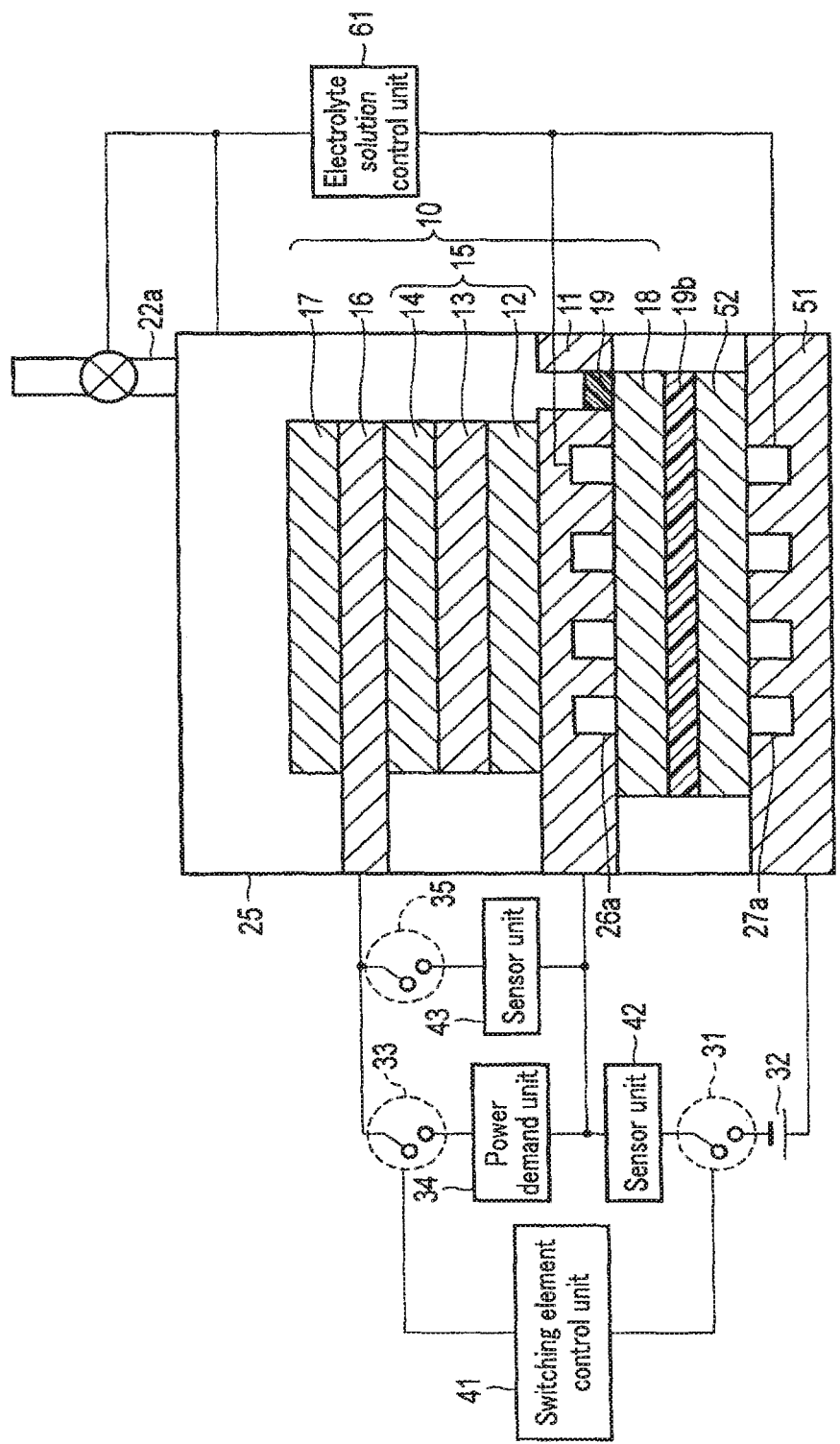
F I G. 21

CHEMICAL REACTION DEVICE

CROSS-REFERENCE TO RELATED APPLICATIONS

This application is a Divisional of U.S. Non-Provisional application Ser. No. 15/066,272, which was filed on Mar. 10, 2016. Application Ser. No. 15/066,272 is a Continuation Application of PCT application No. PCT/JP2014/071407, filed Aug. 13, 2014. This application is based upon and claims the benefit of priority from the prior Japanese Patent Application No. 2013-192115, filed Sep. 17, 2013, the entire contents of which are incorporated herein by reference.

FIELD

Embodiments described herein relate generally to a chemical reaction device.

BACKGROUND

From the viewpoint of energy problems and environmental problems, renewable energy is rapidly increasing. Particularly, in EU, there exist countries such as Sweden where the renewable energy makes up 50% of the energy (natural energy).

Since power (electrical energy) consumption always changes depending on human's daily activities, demand and supply balance deteriorates. When atomic energy that is difficult to adjust the output is combined with irregular natural energy to compensate for power consumption, it is feared that generation of surplus power will increase because of a failure in matching to the power consumption. If renewable energy increases in the future, there will be a limit to output adjustment by thermal energy.

Although the surplus power may be transmitted to regions with a short supply of electricity, transmission poses problems of energy loss, cost, and the like. Current measures against these problems are water pumping for pumped storage hydroelectricity and storage of electricity using a storage battery. However, land appropriate for construction of a dam capable of generating power by pumped storage is limited, and the storage battery is expensive.

As described above, electric energy has problems concerning storage and transmission of electricity. On the other hand, an artificial photosynthesis system has been proposed as renewable energy that can be stored and transported.

Artificial photosynthesis is a technology of generating a chemical fuel (chemical energy) by light energy, like plants. The plants use a system called Z scheme that excites light energy in two stages. Using solar energy, the plants oxidize water and obtain electrons, and deoxidize carbon dioxide and synthesize cellulose or saccharides. In the artificial photosynthesis, the photosynthesis reaction of plants is enabled by an artificial photochemical reaction.

In Jpn. Pat. Appln. KOKAI Publication No. 2011-094194, a carbon dioxide ($CO_2$) reducing catalyst is formed on the surface of a photocatalyst. This $CO_2$ reducing catalyst is connected to another photocatalyst by an electric wire. The other photocatalyst obtains a potential by light energy. The $CO_2$ reducing catalyst obtains a reduction potential from the other photocatalyst by the electric wire, thereby reducing $CO_2$ and producing formic acid. Thus, Jpn. Pat. Appln. KOKAI Publication No. 2011-094194 uses two-stage excitation in order to obtain a potential necessary to reduce $CO_2$ by the photocatalyst by using visible light. However, the efficiency of conversion from the sunlight to the chemical energy is as very low as 0.04%. This is so because the energy efficiency of the photocatalyst which is excited by visible light is low.

In Jpn. Pat. Appln. KOKAI Publication No. 10-290017, an arrangement is considered in which a silicon solar cell is used to obtain a reaction potential, and a reaction is caused by providing a catalyst on each of the surfaces of the silicon solar cell. In S. Y. Reece, et. al., Science. vol. 334, pp. 645 (2011), a multilayered structure of silicon solar cells is used to obtain a reaction potential. An electrolytic reaction of water ($H_2O$) is caused by providing a catalyst on each of the surfaces of the structure. In these related arts, the conversion efficiency from sunlight energy to chemical energy is as high as 4.7%.

In these artificial photosynthesis systems, however, the conversion efficiency cannot exceed the sunlight energy conversion efficiency of a solar cell. In other words, since the electromotive force is obtained by charge separation of the solar cell, it is impossible to exceed the sunlight energy conversion efficiency of the solar cell.

For this reason, these artificial photosynthesis systems effectively function in a case with surplus power but not in a case with power shortage. That is, in a case with power shortage, the efficiency of directly converting sunlight energy into electric energy using a solar cell than the efficiency of converting sunlight energy into chemical energy by these artificial photosynthesis systems and then converting the chemical energy into electric energy. Hence, when power supply is short, generating electric energy using a solar cell is more efficient than generating chemical energy using an artificial photosynthesis system.

To solve both the problem in the case with surplus power and that in the case of power shortage, both the artificial photosynthesis system and the solar cell may be installed. However, when the artificial photosynthesis system and the solar cell are installed, the installation area needs to be at least twice larger.

When surplus power exists, and sunlight energy is small, a method of converting electric energy into chemical energy using a normal electrolytic system using a power supply is usable in addition to the artificial photosynthesis system. However, there are problems that the solar cell and the electrolytic system need to be connected, and the device needs to be operated following unstable natural energy.

There is no integrated device that appropriately operates as an artificial photosynthesis system, a solar cell, and an electrolytic system so as to raise the energy conversion efficiency in accordance with conditions such as the presence/absence of surplus power and the presence/absence of sunlight energy.

BRIEF DESCRIPTION OF THE DRAWING

FIG. 2 is a view showing the artificial photosynthesis system operation of the chemical reaction device according to the first embodiment;

FIG. 4 is a view showing the solar cell operation of the chemical reaction device according to the first embodiment;

FIG. 5 is a view showing a modification of the solar cell operation of the chemical reaction device according to the first embodiment;

FIG. 9 is a schematic view showing an example of the arrangement of a chemical reaction device according to the second embodiment;

FIG. 12 is a view showing the solar cell operation of the chemical reaction device according to the second embodiment;

FIG. 13 is a view showing a modification of the solar cell operation of the chemical reaction device according to the second embodiment;

FIG. 15 is a schematic view showing the arrangement of the second modification of the chemical reaction device according to the second embodiment;

FIG. 18 is a view showing the electrolytic system operation of the chemical reaction device according to the third embodiment;

FIG. 19 is a view showing the solar cell operation of the chemical reaction device according to the third embodiment;

FIG. 20 is a view showing a modification of the solar cell operation of the chemical reaction device according to the third embodiment; and FIG. 21 is a schematic view showing the arrangement of the first modification of the chemical reaction device according to the third embodiment.

DETAILED DESCRIPTION

Figure 1:
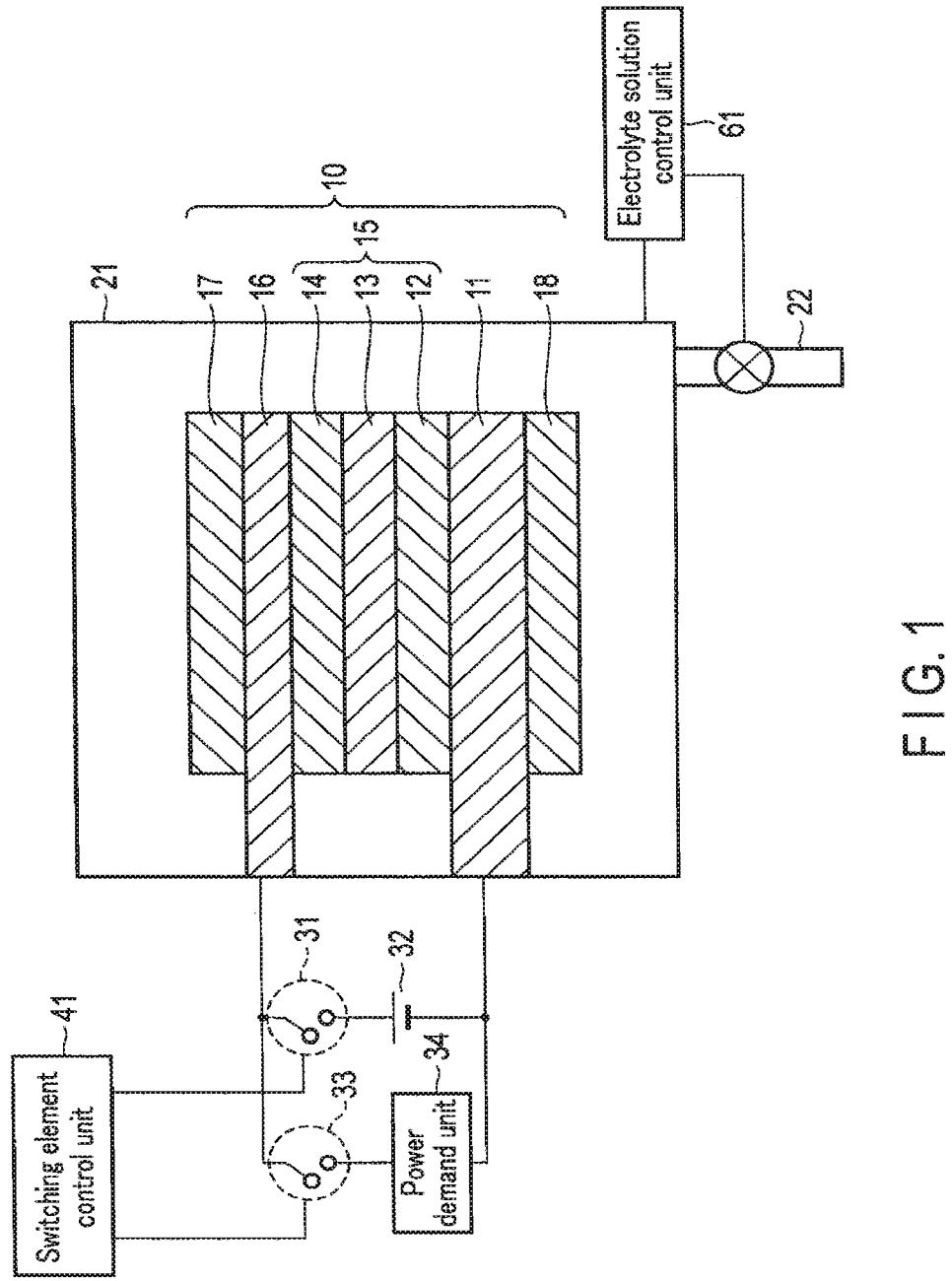
FIG. 1 is a schematic view showing an example of the arrangement of a chemical reaction device according to the first embodiment.

In general, according to one embodiment, a chemical reaction device of the embodiment, the chemical reaction device includes an electrolytic cell configured to store an electrolyte solution, a stack including a first electrode stored in the electrolytic cell and arranged on a light irradiation side, a second electrode arranged on a side opposite to the light irradiation side, and a photovoltaic layer formed between the first electrode and the second electrode and configured to perform charge separation by light energy, an external power supply electrically connected between the first electrode and the second electrode via a first switching element, a power demand unit electrically connected between the first electrode and the second electrode via a second switching element and connected in parallel to the external power supply, and a switching element control unit configured to on/off-control the first switching element and the second switching element.

Embodiments will now be described with reference to the accompanying drawings. The same reference numerals denote the same parts throughout the drawings, and a repetitive explanation will be made as needed.

1. First Embodiment

A chemical reaction device according to the first embodiment will be described below with reference to FIGS. 1, 2, 3, 4, 5, 6, 7, and 8.

The chemical reaction device according to the first embodiment is formed from a stack 10 including a first electrode 16, a photovoltaic layer 15, and a second electrode 11, an electrolytic cell 21 that stores the stack 10, and an external power supply 32 and a power demand unit 34 which can electrically be connected to or disconnected from the stack 10. The chemical reaction device can thus function as an electrolytic system by electrically connecting the stack 10 and the external power supply 32, function as a solar cell by electrically connecting the stack 10 and the power demand unit 34, and function as an artificial photosynthesis system by electrically connecting the stack 10, the external power supply 32, and the power demand unit 34. It is therefore possible to provide an integrated chemical reaction device that appropriately operates in accordance with various conditions. The first embodiment will be described below in detail.

1-1. Arrangement of First Embodiment

FIG. 1 is a schematic view showing an example of the arrangement of the chemical reaction device according to the first embodiment. Note that FIG. 1 illustrates the sectional structures of the stack 10 and the electrolytic cell 21.

As shown in FIG. 1, the chemical reaction device according to the first embodiment includes the stack 10, the electrolytic cell 21, the external power supply 32, the power demand unit 34, a switching element control unit 41, and an electrolyte solution control unit 61.

The electrolytic cell 21 stores the stack 10 inside. The electrolytic cell 21 stores an electrolyte solution 23 inside so as to immerse the stack 10. The electrolyte solution 23 is a solution containing, for example, $H_2O$. As the solution, a solution containing an arbitrary electrolyte is usable. The solution preferably promotes an oxidation reaction of $H_2O$. The electrolyte solution 23 is also a solution containing, for example, $CO_2$. The upper surface of the electrolytic cell 21 is provided with a window portion made of, for example, glass or acryl with a high light transmittance. Irradiation light enters from above the electrolytic cell 21. By the irradiation light, the stack 10 causes an oxidation reduction reaction.

A tube 22 is connected to the electrolytic cell 21. The tube 22 injects the electrolyte solution 23 into the electrolytic cell 21 or discharges the electrolyte solution 23 from the electrolytic cell 21.

The electrolyte solution control unit 61 controls the electrolyte solution 23 in the electrolytic cell 21. More specifically, the electrolyte solution control unit 61 measures the amount of the electrolyte solution 23 in the electrolytic cell 21, and controls injection and discharge of the electrolyte solution 23 by the tube 22. When the chemical reaction device is used as an artificial photosynthesis system or electrolytic system, the electrolyte solution control unit 61 fills the electrolytic cell 21 with the electrolyte solution 23 such that a sufficient electrolytic reaction occurs. When the chemical reaction device is used as a solar cell, the electrolyte solution control unit 61 discharges the electrolyte solution 23 from the electrolytic cell 21 and fills the electrolytic cell 21 with air so no electricity flows through the electrolyte solution 23. Not air but any other substance such as a gas or a liquid may be used if it has a low conductivity.

The stack 10 includes the first electrode 16, the photovoltaic layer 15, the second electrode 11, a first catalyst 17, and a second catalyst 18. The stack 10 has a flat plate shape that extends flat, and the layers are sequentially formed using the second electrode 11 as a base (substrate). Note that an explanation will be made here by defining the light irradiation side as the obverse surface (upper surface) and the side opposite to the light irradiation side as the reverse surface (lower surface).

The second electrode 11 has conductivity. The second electrode 11 is provided to support the stack 10 and increase its mechanical strength. The second electrode 11 is formed from a metal plate of, for example, Cu, Al, Ti, Ni, Fe, or Ag or an alloy plate of, for example, SUS containing at least one of them. The second electrode 11 may be made of a conductive resin or the like. The second electrode 11 may be formed from a semiconductor substrate such as Si or be or an ion exchange membrane.

The photovoltaic layer 15 is formed on the second electrode 11 (on the obverse surface (upper surface)). The photovoltaic layer 15 includes a first photovoltaic layer 12, a second photovoltaic layer 13, and a third photovoltaic layer 14.

The first photovoltaic layer 12, the second photovoltaic layer 13, and the third photovoltaic layer 14 are solar cells using a pin-junction semiconductor, and have different light absorption wavelengths. When they are stacked flat, the photovoltaic layer 15 can absorb light components of wide wavelengths of sunlight, and the sunlight energy can efficiently be used. In addition, since the photovoltaic layers are connected in series, a high open circuit voltage can be obtained.

More specifically, the first photovoltaic layer 12 is formed on the second electrode 11, and is formed from, for example, an n-type amorphous silicon (a-Si) layer, an intrinsic amorphous silicon germanium (a-SiGe) layer, and a p-type microcrystalline silicon (μc-Si) layer which are formed sequentially from the lower side. Here, the a-SiGe layer is a layer that absorbs light in a long-wavelength region of about 700 nm. That is, in the first photovoltaic layer 12, charge separation is caused by light energy in the long-wavelength region.

The second photovoltaic layer 13 is formed on the first photovoltaic layer 12, and is formed from, for example, an n-type a-Si layer, an intrinsic a-SiGe layer, and a p-type μc-Si layer which are formed sequentially from the lower side. Here, the a-SiGe layer is a layer that absorbs light in a medium-wavelength region of about 600 nm. That is, in the second photovoltaic layer 13, charge separation is caused by light energy in the medium-wavelength region.

The third photovoltaic layer 14 is formed on the second photovoltaic layer 13, and is formed from, for example, an n-type a-Si layer, an intrinsic a-Si layer, and a p-type μc-Si layer which are formed sequentially from the lower side. Here, the a-Si layer is a layer that absorbs light in a short-wavelength region of about 400 nm. That is, in the third photovoltaic layer 14, charge separation is caused by light energy in the short-wavelength region.

As described above, in the photovoltaic layer 15, charge separation is caused by light in each wavelength region. That is, holes are separated to the anode side (obverse surface side), and electrons are separated to the cathode side (reverse surface side). The photovoltaic layer 15 thus generates electromotive force.

The first electrode 16 is formed on the p-type semiconductor layer (p-type μc-Si layer) of the photovoltaic layer 15. For this reason, the first electrode 16 is preferably made of a material capable of coming into an ohmic contact with the p-type semiconductor layer. The first electrode is made of a metal such as Ag, Au, Al, or Cu or an alloy containing at least one of them. The first electrode 16 may be made of a transparent conductive oxide such as ITO, ZnO, FTO, AZO, or ATO. The first electrode 16 may be formed from, for example, a structure in which a metal and a transparent conductive oxide are stacked, a structure in which a metal and another conductive material are compounded, or a structure in which a transparent conductive oxide and another conductive material are compounded.

In this example, irradiation light passes through the first electrode 16 and reaches the photovoltaic layer 15.

Hence, the first electrode 16 arranged on the light irradiation side (upper side in the drawing) has light transmission properties to the irradiation light. More specifically, the light transmittance of the first electrode 16 on the light irradiation side is preferably at least 10% or more, and more preferably, 30% or more of the irradiation amount of the irradiation light. Alternatively, the first electrode 16 has apertures capable of passing light. That is, the first electrode 16 need not always have a membrane shape, and may have a lattice shape, grain shape, or wire shape. The aperture ratio is preferably at least 10% or more, and more preferably, 30% or more.

Note that an example of the photovoltaic layer 15 formed from a multilayered structure of three photovoltaic layers (the first photovoltaic layer 12, the second photovoltaic layer 13, and the third photovoltaic layer 14) has been described above. However, the present invention is not limited to this. The photovoltaic layer 15 may formed from a multilayered structure of two or four or more photovoltaic layers. One photovoltaic layer may be used in place of the multilayered structure of photovoltaic layers. A solar cell using a pin-junction semiconductor has been described above. However, the solar cell may use a pn-junction semiconductor. An example in which the semiconductor layers are made of Si and Ge has been described above. However, the present invention is not limited to this, and the semiconductor layers may be made of a compound semiconductor, for example, GaAs, GaInP, AlGaInP, CdTe, or CuInGaSe. Various forms such as a single crystal, polycrystal, and amorphous are applicable. The first electrode 16 and the second electrode 11 may be provided partially or all over the photovoltaic layer 15.

The first catalyst 17 is formed on the upper surface of the first electrode 16. The first catalyst 17 is provided to increase chemical reactivity (oxidation reactivity) near the obverse surface of the first electrode 16. When an aqueous solution, that is, a solution containing $H_2O$ is used as the electrolyte solution 23, the first electrode 16 oxidizes $H_2O$ to generate $O_2$ and $H^+$. For this purpose, the first catalyst 17 is made of a material that decreases activation energy to oxidize $H_2O$. In other words, the first catalyst 17 is made of a material that lowers an overvoltage upon oxidizing $H_2O$ and generating $O_2$ and $H^+$. Examples of the material are a binary metal oxide such as manganese oxide (Mn—O), iridium oxide (Ir—O), nickel oxide (Ni—O), cobalt oxide (Co—C), iron oxide (Fe—O), tin oxide (Sn—O), indium oxide (In—O), or ruthenium oxide (Ru—O), a ternary metal oxide such as Ni—Co—O, Ni—Fe—O, La—Co—O, Ni—La—O, or Sr—Fe—O, a quaternary metal oxide such as Pb—Ru—Ir—O, or La—Sr—Co—O, and a metal complex such as an Ru complex or an Fe complex. The first catalyst 17 need not always have a membrane shape, and may have a lattice shape, grain shape, or wire shape. A metal portion of the structure of the first electrode 16 in which a metal and a transparent conductive oxide are stacked or a metal portion of the structure in which a metal and another conductive material are compounded may have catalytic performance. The electrode metal itself may have catalytic performance. This can simplify the structure.

The second catalyst 18 is formed on the lower surface of the second electrode 11. The second catalyst 18 is provided to increase chemical reactivity (reduction reactivity) near the reverse surface of the second electrode 11. When a solution containing $CO_2$ is used as the electrolyte solution 23, $CO_2$ is reduced to generate a carbon compound (for example, CO, HCOOH, $CH_4$, $CH_3OH$, $C_2H_5OH$, or $C_2H_4$) or the like. For this purpose, the second catalyst 18 is made of a material that decreases activation energy to reduce $CO_2$. In other words, the second catalyst 18 is made of a material that lowers an overvoltage upon reducing $CO_2$ and generating a carbon compound. Examples of the material like this are metals such as Au, Ag, Cu, Pt, C, Ni, Zn, C, graphene, CNT (Carbon NanoTube), fullerene, ketjen black, and Pd, alloys containing at least one of these metals, and metal complexes such as an Ru complex and Re complex. Also, when using an aqueous solution that does not contain $CO_2$, i.e., $H_2O$ as the electrolyte solution 23, the second catalyst 18 reduces $H_2O$ and generates $H_2$. Therefore, the second catalyst layer 18 is made of a material which reduces activation energy for reducing $H_2O$. In other words, the second catalyst layer 18 is made of a material which decreases an overvoltage when generating $H_2$ by reducing $H_2O$. Examples of the material like this are metals such as Ni, Fe, Pt, Ti, Au, Ag, Zn, Pd, Ga, Mn, Cd, C, and graphene, and alloys containing at least one of these metals. Furthermore, the shape of the second catalyst layer 18 is not limited to a thin film, and may also be a lattice, grain, or wire.

Note that the multilayered structure of the photovoltaic layer 15 may be reversed to reverse the overvoltage lowering functions of the first electrode 16 and the second electrode 11 by the first catalyst 17 and the second catalyst 18.

The external power supply 32 is electrically connected between the first electrode 16 and the second electrode 11 via a first switching element 31. In other words, the first switching element 31 is formed between the external power supply 32 and the first electrode 16 or second electrode 11. When the first switching element 31 is turned on, the first electrode 16 and the second electrode 11 are electrically connected via the external power supply 32. On the other hand, when the first switching element 31 is turned off, the first electrode 16 and the second electrode 11 are electrically disconnected via the external power supply 32. The first electrode 16 is connected to the anode side of the external power supply 32, and the second electrode 11 is connected to the cathode side. In a case with surplus power, the external power supply 32 supplies power to the first electrode 16 and the second electrode 11, as will be described later in detail.

The power demand unit 34 is electrically connected between the first electrode 16 and the second electrode 11 via a second switching element 33. The power demand unit 34 is connected in parallel to the external power supply 32. In other words, the second switching element 33 is formed between the power demand unit 31 and the first electrode 16 or second electrode 11. When the second switching element 33 is turned on, the first electrode 16 and the second electrode 11 are electrically connected via the power demand unit 34. On the other hand, when the second switching element 33 is turned off, the first electrode 16 and the second electrode 11 are electrically disconnected via the power demand unit 34. In a case without surplus power, power is supplied from the photovoltaic layer 15 to the power demand unit 34, as will be described later in detail. The power demand unit 34 is, for example, a storage battery that stores power or a region where power is consumed.

The switching element control unit 41 on/off-controls the first switching element 31 and the second switching element 33 in accordance with conditions such as the presence/absence of surplus power more than the demand of the power demand unit 34 and the presence/absence of sunlight energy.

More specifically, in a case with surplus power and sunlight energy, the switching element control unit 41 turns off the first switching element 31 and the second switching element 33. The first electrode 16 and the second electrode 11 are thus electrically connected via only the photovoltaic layer 15. As a result, electromotive force generated by the photovoltaic layer 15 causes electrolysis in the first electrode 16 and the second electrode 11, and chemical energy is generated. That is, the chemical reaction device functions as an artificial photosynthesis system.

On the other hand, in a case with surplus power but without sunlight energy, the switching element control unit 41 turns off the second switching element 33 and turns on the first switching element 31. The first electrode 16 and the second electrode 11 are thus electrically connected via the external power supply 32. As a result, electromotive force generated by the external power supply 32 causes electrolysis in the first electrode 16 and the second electrode 11, and chemical energy is generated. That is, the chemical reaction device functions as an electrolytic system.

In a case without surplus power, the switching element control unit 41 turns off the first switching element 31 and turns on the second switching element 33. The photovoltaic layer 15 and the power demand unit 34 are thus electrically connected. As a result, power is supplied to the power demand unit 34 by electromotive force generated by the photovoltaic layer 15. That is, the chemical reaction device functions as a solar cell.

When sunlight is short, the artificial photosynthesis system can perform a hybrid operation by augmenting the current via an externally adjusted electric device. The artificial photosynthesis system may change the product by adjusting the voltage and current via an externally adjusted electric device in accordance with the demand for the product or the like.

1-2. Operation of First Embodiment

FIG. 2 is a view showing the artificial photosynthesis system operation of the chemical reaction device according to the first embodiment. The artificial photosynthesis system is used mainly in a case with surplus power and sunlight energy.

As shown in FIG. 2, when the chemical reaction device is used as the artificial photosynthesis system, the switching element control unit 41 turns off the first switching element 31 and the second switching element 33. The first electrode 16 and the second electrode 11 are thus electrically disconnected via the external power supply 32. In addition, the first electrode 16 and the second electrode 11 are electrically disconnected via the power demand unit 34.

The electrolyte solution control unit 61 controls the amount of the electrolyte solution 23 in the electrolytic cell 21 so as to immerse the first electrode 16 and the second electrode 11 in the electrolyte solution 23. The electrolyte solution 23 is thus injected into the electrolytic cell 21 via the tube 22, and the electrolytic cell 21 is filled with the electrolyte solution 23. Note that the electrolytic cell 21 need not always be filled with the electrolyte solution 23, and immersing at least part of the first electrode 16 and the second electrode 11 in the electrolyte solution 23 suffices.

When light enters from above in this state, irradiation light passes through the first electrode 16 and reaches the photovoltaic layer 15. Upon absorbing the light, the photovoltaic layer 15 generates electrons and holes as counterparts, and separates them. That is, in each of the photovoltaic layers (the first photovoltaic layer 12, the second photovoltaic layer 13, and the third photovoltaic layer 14), the electrons move to the side of the n-type semiconductor layer (the side of the second electrode 11), and holes generated as the counterparts of the electrons move to the side of the p-type semiconductor layer (the side of the first electrode 16) so that charge separation occurs. Electromotive force is thus generated in the photovoltaic layer 15.

The electrons generated in the photovoltaic layer 15 and moved to the second electrode 11 that is the electrode on the cathode side are used in a reduction reaction near the reverse surface of the second electrode 11 (near the second catalyst 18). On the other hand, the holes generated in the photovoltaic layer 15 and moved to the first electrode 16 that is the electrode on the anode side are used in an oxidation reaction near the obverse surface of the first electrode 16 (near the first catalyst 17). More specifically, a reaction represented by formula (1) occurs near the obverse surface of the first electrode 16 in contact with the electrolyte solution 23, and a reaction represented by formula (2) occurs near the reverse surface of the second electrode 11.

$$2H_2O \rightarrow 4H^+ + O_2 + 4e^- \qquad (1)$$

$$2CO_2 + 4H^+ + 4e^- \rightarrow 2CO + 2H_2O \qquad (2)$$

As indicated by formula (1), near the obverse surface of the first electrode 16, $H_2O$ is oxidized (loses electrons), and oxygen ($O_2$) and hydrogen ions ($H^+$) are generated. $H^+$ generated on the side of the first electrode 16 moves to the side of the second electrode 11.

As indicated by formula (2), near the reverse surface of the second electrode 11, $CO_2$ reacts with $H^+$ that has moved, and carbon monoxide (CO) and $H_2O$ are generated. That is, $CO_2$ is reduced (obtains electrons).

At this time, the photovoltaic layer 15 needs to have an open circuit voltage equal to or more than the potential difference between the standard oxidation reduction potential of the oxidation reaction that occurs in the first electrode 16 and the standard oxidation reduction potential of the reduction reaction that occurs in the second electrode 11. For example, the standard oxidation reduction potential of the oxidation reaction of formula (1) is 1.23 [V], and the standard oxidation reduction potential of the reduction reaction of formula (2) is −0.1 [V]. For this reason, the open circuit voltage of the photovoltaic layer 15 needs to be 1.33 [V] or more. Note that more preferably, the open circuit voltage needs to be equal to or more than the potential difference including overvoltages. More specifically, for example, if the overvoltage of the oxidation reaction of formula (1) and that of the reduction reaction of formula (2) are 0.2 [V] each, the open circuit voltage is preferably 1.73 [V] or more.

Note that not only the reduction reaction from $CO_2$ to CO represented by formula (2) but also a reduction reaction from $CO_2$ to HCOOH, $CH_4$, $C_2H_4$, $CH_3OH$, $C_2H_5OH$, or the like can be caused. A reduction reaction of $H_2O$ used in the electrolyte solution 23 can also be caused, and $H_2$ can also be generated. The generated reduced substance of $CO_2$ can be changed by changing the amount of water ($H_2O$) in the solution. For example, the generation ratio of HCOOH, $CH_4$, $CH_3OH$, $C_2H_5OH$, or $H_2$ can be changed.

As described above, in the artificial photosynthesis system, electromotive force is generated in the photovoltaic layer 15 by sunlight energy. The electromotive force causes an oxidation reduction reaction (electrolytic reaction), and chemical energy is generated. That is, sunlight energy can be converted into chemical energy.

Figure 3:
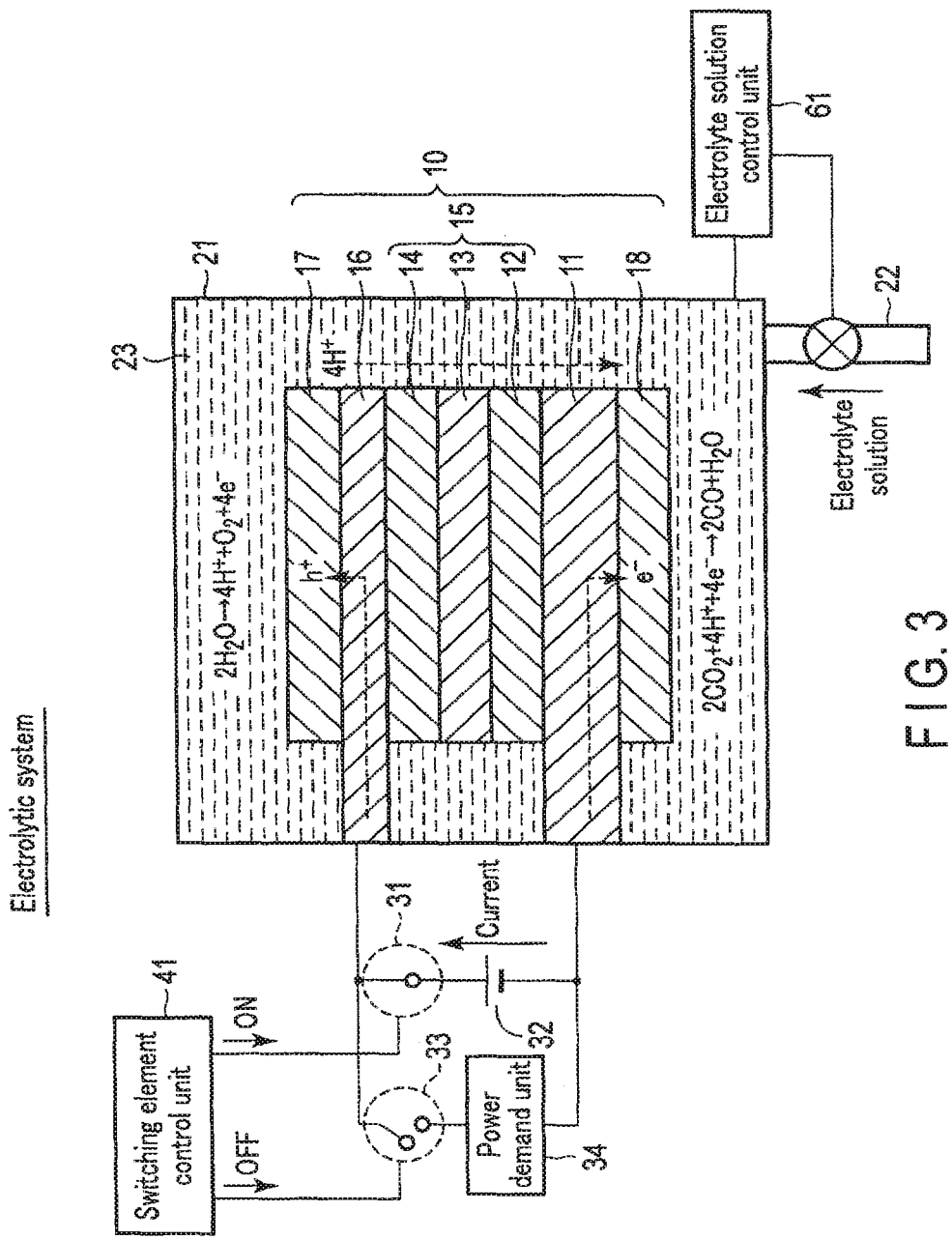
FIG. 3 is a view showing the electrolytic system operation of the chemical reaction device according to the first embodiment.

FIG. 3 is a view showing the electrolytic system operation of the chemical reaction device according to the first embodiment. The electrolytic system is used mainly in a case with surplus power but without sunlight energy. For example, the electrolytic system can be used at nighttime.

As shown in FIG. 3, when the chemical reaction device is used as the electrolytic system, the switching element control unit 41 turns on the first switching element 31. The first electrode 16 and the second electrode 11 are thus electrically connected via the external power supply 32. On the other hand, the switching element control unit 41 turns off the second switching element 33. The first electrode 16 and the second electrode 11 are thus electrically disconnected via the power demand unit 34.

The electrolyte solution control unit 61 controls the amount of the electrolyte solution 23 in the electrolytic cell 21 so as to immerse the first electrode 16 and the second electrode 11 in the electrolyte solution 23. The electrolyte solution 23 is thus injected into the electrolytic cell 21 via the tube 22, and the electrolytic cell 21 is filled with the electrolyte solution 23. Note that the electrolytic cell 21 need not always be filled with the electrolyte solution 23, and immersing at least part of the first electrode 16 and the second electrode 11 in the electrolyte solution 23 suffices.

When electromotive force is generated in the external power supply 32 in this state, holes move to the side of the first electrode 16 connected to the anode side of the external power supply 32. On the other hand, electrons move to the side of the second electrode 11 connected to the cathode side of the external power supply 32. The electrons moved to the second electrode 11 that is the electrode on the cathode side are used in a reduction reaction near the reverse surface of the second electrode 11. On the other hand, the holes generated in the photovoltaic layer 15 and moved to the first electrode 16 that is the electrode on the anode side are used in an oxidation reaction near the obverse surface of the first electrode 16. More specifically, a reaction represented by formula (1) occurs near the obverse surface of the first electrode 16 in contact with the electrolyte solution 23, and a reaction represented by formula (2) occurs near the reverse surface of the second electrode 11.

As indicated by formula (1), near the obverse surface of the first electrode 16, $H_2O$ is oxidized (loses electrons), and $O_2$ and hydrogen ions ($H^+$) are generated. $H^+$ generated on the side of the first electrode 16 moves to the side of the second electrode 11.

As indicated by formula (2), near the reverse surface of the second electrode 11, $CO_2$ reacts with $H^+$ that has moved, and CO and $H_2O$ are generated. That is, $CO_2$ is reduced (obtains electrons).

At this time, the photovoltaic layer 15 needs to have an open circuit voltage equal to or more than the potential difference between the standard oxidation reduction potential of the oxidation reaction that occurs in the first electrode 16 and the standard oxidation reduction potential of the reduction reaction that occurs in the second electrode 11. For example, the standard oxidation reduction potential of the oxidation reaction of formula (1) is 1.23 [V], and the standard oxidation reduction potential of the reduction reaction of formula (2) is −0.1 [V]. For this reason, the open circuit voltage of the photovoltaic layer 15 needs to be 1.33 [V] or more. Note that more preferably, the open circuit voltage needs to be equal to or more than the potential difference including overvoltages. More specifically, for example, if the overvoltage of the oxidation reaction of formula (1) and that of the reduction reaction of formula (2) are 0.2 [V] each, the open circuit voltage is preferably 1.73 [V] or more.

Note that not only the reduction reaction from $CO_2$ to CO represented by formula (2) but also a reduction reaction from $CO_2$ to HCOOH, $CH_4$, $C_2H_4$, $CH_3OH$, $C_2H_5OH$, or the like can be caused. A reduction reaction of $H_2O$ used in the electrolyte solution 23 can also be caused, and $H_2$ can also be generated. The generated reduced substance of $CO_2$ can be changed by changing the amount of water ($H_2O$) in the solution. For example, the generation ratio of HCOOH, $CH_4$, $CH_3OH$, $C_2H_5OH$, or $H_2$ can be changed.

In addition, depending on the diode characteristic of the semiconductor layers included in the photovoltaic layer 15, the current that flows in accordance with the directions of the arrangements of the semiconductor layers may be small.

As described above, in the electrolytic system, electromotive force is generated in the external power supply 32 by the electric energy of surplus power. The electromotive force causes an oxidation reduction reaction (electrolytic reaction), and chemical energy is generated. That is, electric energy can be converted into chemical energy.

FIG. 4 is a view showing the solar cell operation of the chemical reaction device according to the first embodiment. FIG. 5 is a view showing a modification of the solar cell operation of the chemical reaction device according to the first embodiment. The solar cell is used mainly in a case without surplus power.

As shown in FIG. 4, when the chemical reaction device is used as the solar cell, the switching element control unit 41 turns off the first switching element 31. The first electrode 16 and the second electrode 11 are thus electrically disconnected via the external power supply 32. On the other hand, the switching element control unit 41 turns on the second switching element 33. The first electrode 16 and the second electrode 11 are thus electrically connected via the power demand unit 34.

At this time, it is preferable that ions do not move between the first electrode 16 and the second electrode 11 via the electrolyte solution 23. That is, preferably, no current flows via the electrolyte solution 23. This is because discharge to the power demand unit 34 occurs at the same time as power generation by the photovoltaic layer 15. To do this, the electrolyte solution control unit 61 controls the amount of the electrolyte solution 23 in the electrolytic cell 21 so as not to immerse the first electrode 16 and the second electrode 11 in the electrolyte solution 23. The electrolyte solution 23 is thus discharged from the electrolytic cell 21 via the tube 22, and the electrolytic cell 21 is filled with air.

Note that the electrolytic cell 21 need not always be filled with air, and prohibiting at least part of the first electrode 16 or part of the second electrode 11 from being immersed in the electrolyte solution 23 suffices. At this time, as shown in FIG. 5, the electrolytic cell 21 may partially be filled with a gas (for example, $O_2$) generated by the above-described artificial photosynthesis system or electrolytic system. In this case, the electrolyte solution 23 need not be discharged from the electrolytic cell 21 via the tube 22. That is, it is unnecessary to use a pump and the like provided on the tube 22, and energy loss can be reduced. In this case, the first electrode 16 is preferably arranged on the side opposite to the gravity. In addition, the oxidation electrode (first electrode 16) and the reduction electrode (second electrode 11) may be separated by a partition that does not pass ions.

The discharged electrolyte solution 23 may be stored, via the tube 22, in an electrolyte solution storage tank connected to the tube 22. The electrolytic cell 21 may be filled with not a gas but, a nonconductive liquid.

When entering from above in this state, irradiation light passes through the first electrode 16 and reaches the photovoltaic layer 15. Upon absorbing the light, the photovoltaic layer 15 generates electrons and holes as counterparts, and separates them. That is, in each of the photovoltaic layers (the first photovoltaic layer 12, the second photovoltaic layer 13, and the third photovoltaic layer 14), the electrons moves to the side of the n-type semiconductor layer (the side of the second electrode 11), and holes generated as the counterparts of the electrons move to the side of the p-type semiconductor layer (the side of the first electrode 16) so that charge separation occurs. Electromotive force is thus generated in the photovoltaic layer 15. Power can be supplied to the power demand unit 34 by the electromotive force generated by the photovoltaic layer 15.

As described above, in the solar cell, electromotive force is generated in the photovoltaic layer 15 by sunlight energy. By the electromotive force, electric energy is generated. That is, sunlight energy can be converted into electric energy.

Figure 6:
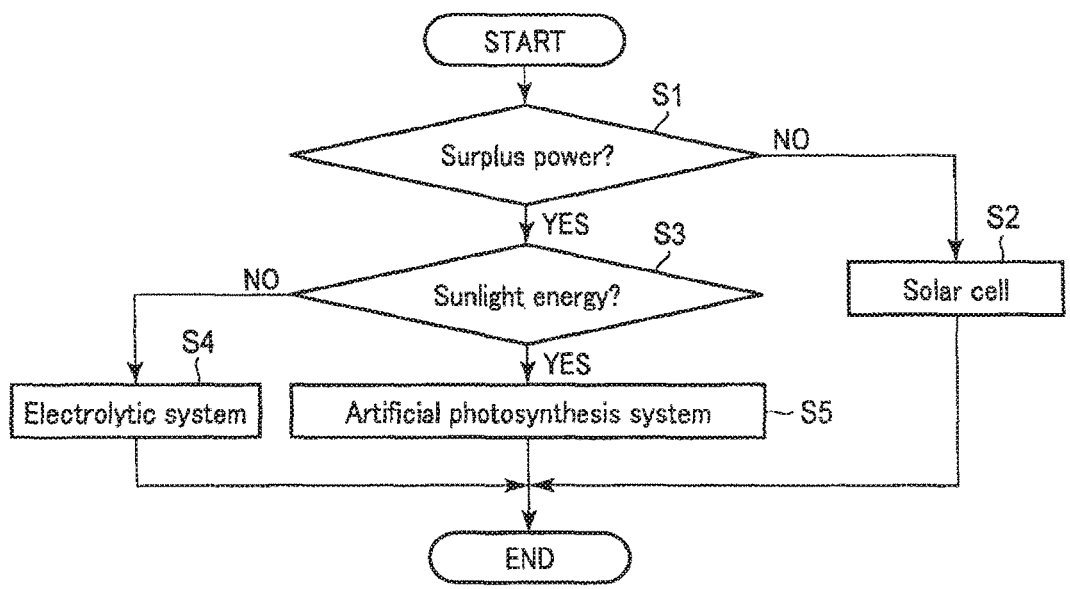
FIG. 6 is a flowchart showing the operation of the chemical reaction device according to the first embodiment.

FIG. 6 is a flowchart showing the operation of the chemical reaction device according to the first embodiment.

As shown in FIG. 6, in step S1, the chemical reaction device confirms whether surplus power more than the demand of the power demand unit 34 exists.

If no surplus power exists in step S1, the chemical reaction device functions as a solar cell in step S2. More specifically, if no surplus power exists, the switching element control unit 41 turns off the first switching element 31, and turns on the second switching element 33. The photovoltaic layer 15 and the power demand unit 34 are thus electrically connected, and power is supplied to the power demand unit 34 by electromotive force generated by the photovoltaic layer 15.

If surplus power exists in step S1, the chemical reaction device confirms in step S3 whether sunlight energy exists.

If no sunlight energy exists in step S3, the chemical reaction device functions as an electrolytic system in step S4. More specifically, if no sunlight energy exists, the switching element control unit 41 turns off the second switching element 33, and turns on the first switching element 31. The first electrode 16 and the second electrode 11 are thus electrically connected via the external power supply 32. Electromotive force generated by the external power supply 32 causes electrolysis in the first electrode 16 and the second electrode 11, and chemical energy is generated.

If sunlight energy exists in step S3, the chemical reaction device functions as an artificial photosynthesis system in step S5. More specifically, if sunlight energy exists, the switching element control unit 41 turns off the first switching element 31 and the second switching element 33. The first electrode 16 and the second electrode 11 are thus electrically connected via only the photovoltaic layer 15. Electromotive force generated by the photovoltaic layer 15 causes electrolysis in the first electrode 16 and the second electrode 11, and chemical energy is generated.

As described above, the chemical reaction device appropriately operates as an artificial photosynthesis system, a solar cell, and an electrolytic system in accordance with various conditions.

Note that the operation of the chemical reaction device is not limited to those described above. For example, if a chemical substance to be manufactured is greatly demanded, electrolytic operation can be performed without surplus power, and the chemical substance may be manufactured in place of power. In addition, various kinds of reactions may be caused inappropriate balance in accordance with the charge level of an external battery or the like or the condition of water storage in pumped storage hydroelectricity.

1-3. Effects of First Embodiment

According to the first embodiment, the chemical reaction device includes the stack 10 including the first electrode 16, the photovoltaic layer 15, and the second electrode 11, the electrolytic cell 21 that stores the stack 10, and the external power supply 32 and the power demand unit 34 both of which can electrically be connected to or disconnected from the stack 10. That is, connection between the stack 10 and the external power supply 32 and connection between the stack 10 and the power demand unit 34 can be switched. It is also possible to electrically disconnect the stack 10 from both the external power supply 32 and the power demand unit 34.

With this arrangement, when the stack 10 and the external power supply 32 are electrically connected, the chemical reaction device can be made to function as an electrolytic system. When the stack 10 and the power demand unit 34 are electrically connected, the chemical reaction device can be made to function as a solar cell. When the stack 10 is electrically disconnected from the external power supply 32 and the power demand unit 34, the chemical reaction device can be made to function as an artificial photosynthesis system. These connections are determined depending on the presence/absence of surplus power and the presence/absence of sunlight energy.

That is, according to the first embodiment, it is possible to provide an integrated chemical reaction device that appropriately operates as an artificial photosynthesis system, a solar cell, or an electrolytic system so as to raise the energy conversion efficiency in accordance with various conditions such as the presence/absence of surplus power and the presence/absence of sunlight energy.

1-4. Modifications of First Embodiment

Figure 7:
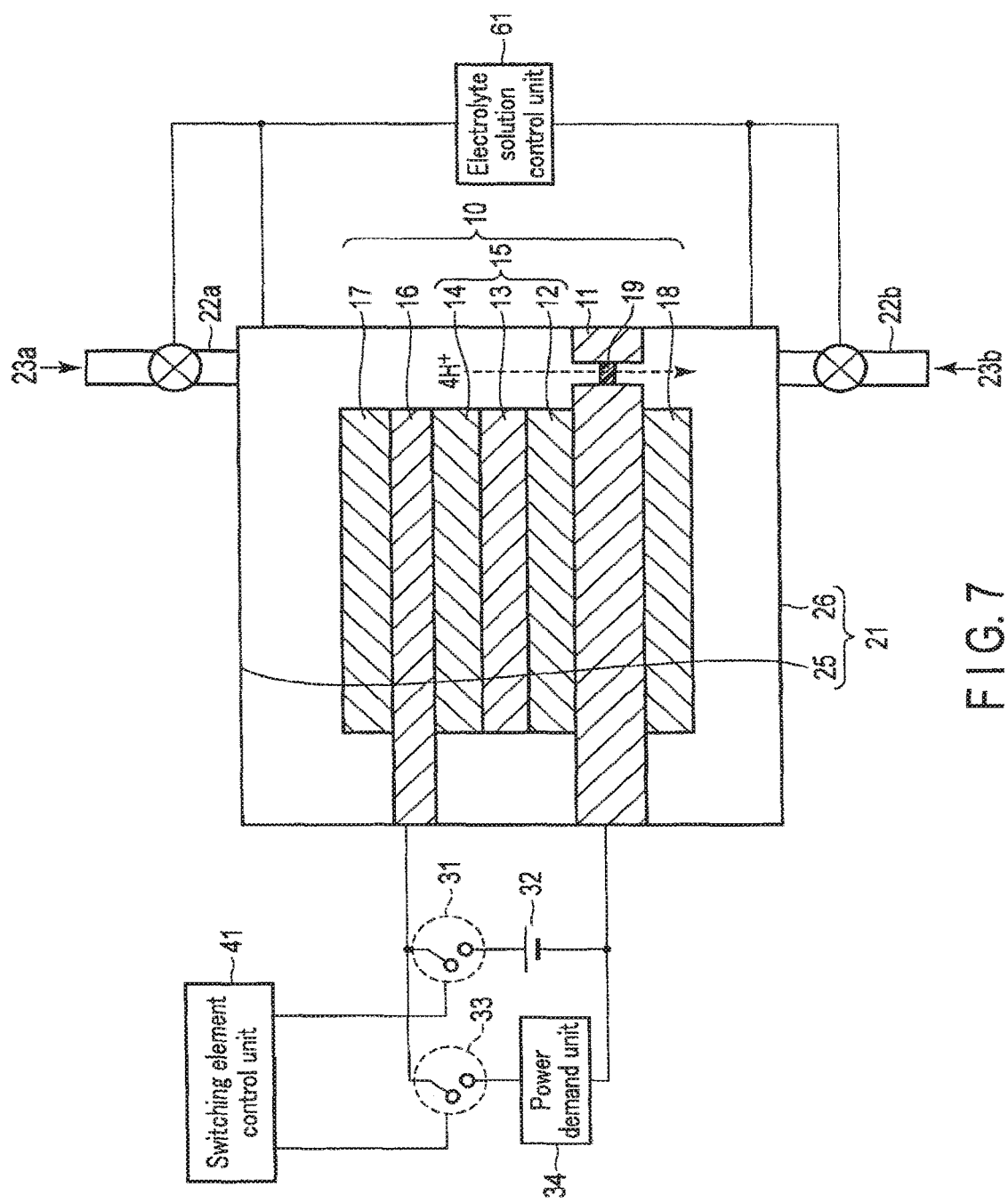
FIG. 7 is a schematic view showing the arrangement of the first modification of the chemical reaction device according to the first embodiment.

FIG. 7 is a schematic view showing the arrangement of the first modification of the chemical reaction device according to the first embodiment.

As shown in FIG. 7, in the first modification of the chemical reaction device according to the first embodiment, the second electrode 11 physically divides the electrolytic cell 21 into a first electrolytic cell 25 and a second electrolytic cell 26.

The first electrolytic cell 25 stores a first electrolyte solution 23a inside so as to immerse the obverse surface (first catalyst 17) of the first electrode 16. The first electrolyte solution 23a is a solution containing, for example, $H_2O$. As the solution, a solution containing an arbitrary electrolyte is usable. The solution preferably promotes an oxidation reaction of $H_2O$. The upper surface of the first electrolytic cell 25 is provided with a window portion made of, for example, glass or acryl with a high light transmittance. Irradiation light enters from above the first electrolytic cell 25.

A tube 22a is connected to the first electrolytic cell 25. The tube 22a injects the first electrolyte solution 23a into the first electrolytic cell 25 or discharges the first electrolyte solution 23a from the first electrolytic cell 25. Note that two tubes 22a may be provided. In this case, one tube 22a may be dedicated to injection, and the other may be dedicated to discharge.

The second electrolytic cell 26 stores a second electrolyte solution 23b inside so as to immerse the reverse surface (second catalyst 18) of the second electrode 11. The second electrolyte solution 23b is a solution containing, for example, $CO_2$. The second electrolyte solution 23b preferably has a high $CO_2$ absorption. Examples of the solution containing $H_2O$ are aqueous solutions of $NaHCO_3$ and $KHCO_3$. The first electrolyte solution 23a and the second electrolyte solution 23b may be identical solutions. However, since the second electrolyte solution 23b preferably has a high $CO_2$ absorption, different solutions may be used as the first electrolyte solution 23a and the second electrolyte solution 23b. The second electrolyte solution 23b also preferably lowers the reduction potential of $CO_2$, exhibits a high ionic conduction property, and contains a $CO_2$ absorbent that absorbs $CO_2$. An example of an electrolyte solution like this is an ion liquid which is made of a salt containing a cation such as an imidazolium ion or pyridinium ion and an anion such as $BF^{4-}$ or $PF^{6-}$, and is in a liquid state over a broad temperature range, or an aqueous solution of this ion liquid. Another example of the electrolyte solution is an amine solution such as ethanolamine, imidazole, or pyridine, or an aqueous solution of this amine solution. Amine can be any of primary amine, secondary amine, and tertiary amine. Examples of primary amine are methylamine, ethylamine, propylamine, butylamine, pentylamine, and hexylamine. Hydrocarbon of amine may be substituted with alcohol or halogen. Examples of amine in which hydrocarbon is substituted are methanolamine, ethanolamine, and chloromethylamine. An unsaturated bond may also exist. These hydrocarbons similarly apply to secondary amine and tertiary amine. Examples of secondary amine are dimethylamine, diethylamine, dipropylamine, dibutylamine, dipentylamine, dihexylamine, dimethanolamine, diethanolamine, and dipropanolamine. Substituted hydrocarbons may also be different. This similarly applies to tertiary amine. Examples of amines having different hydrocarbons are methylethylamine and methylpropylamine. Examples of tertiary amine are trimethylamine, triethylamine, tripropylamine, tributylamine, trihexylamine, trimethanolamine, triethanolamine, tripropanolamine, tributanolamine, tripropanolamine, triexanolamine, methyldiethylamine, and methyldipropylamine. Examples of the cation of the ion liquid are a 1-ethyl-3-methylimidazolium ion, 1-methyl-3-propylimidazolium ion, 1-butyl-3-methylimidazol ion, 1-methyl-3-pentylimidazolium ion, and 1-hexyl-3-methylimidazolium ion. The 2-position of the imidazolium ion may also be substituted. Examples of the imidazolium ion in which the 2-position is substituted are a 1-ethyl-2,3-dimethylimidazolium ion, 1,2-dimethyl-3-propylimidazolium ion, 1-butyl2,3-dimethylimidazolium ion, 1,2-dimethyl-3-pentylimidazolium ion, and 1-hexyl-2,3-dimethylimidazolium ion. Examples of the pyridinium ion are methylpyridinium, ethylpyridinium, propylpyridinium, butylpyridinium, pentylpyridinium, and hexylpyridinium. In both the imidazolinium ion and pyridinium ion, an alkyl group may be substituted, and an unsaturated bond may exist. Examples of the anion are a fluoride ion, a chloride ion, a bromide ion, an iodide ion, $BF^{4-}$, $PF^{6-}$, $CF_3COO^-$, $CF_3SO^{3-}$, $NO^{3-}$, $SCN^-$, $(CF_3SO_2)_3C^-$, bis(trifluoromethoxysulfonyl)imide, bis(trifluoromethoxysulfonyl)imide, and bis(perfluoroethylsulfonyl)imide. It is also possible to use a zweitterion obtained by coupling the cation and anion of the ion liquid by hydrocarbon.

A tube 22b is connected to the second electrolytic cell 26. The tube 22b injects the second electrolyte solution 23b into the second electrolytic cell 26 or discharges the second electrolyte solution 23b from the second electrolytic cell 26. Note that two tubes 22b may be provided. In this case, one tube 22b may be dedicated to injection, and the other may be dedicated to discharge.

The electrolyte solution control unit 61 controls the first electrolyte solution 23a in the first electrolytic cell 25 and the second electrolyte solution 23b in the second electrolytic cell 26. More specifically, the electrolyte solution control unit 61 measures the amounts of the first electrolyte solution 23a in the first electrolytic cell 25 and the second electrolyte solution 23b in the second electrolytic cell 26, and controls injection and discharge of the first electrolyte solution 23a by the tube 22a and the second electrolyte solution 23b by the tube 22b. In a case where the chemical reaction device is used as an artificial photosynthesis system or electrolytic system, the electrolyte solution control unit 61 thus fills the first electrolytic cell 25 with the first electrolyte solution 23a and fills the second electrolytic cell 26 with the second electrolyte solution 23b so as to cause a sufficient electrolytic reaction. In a case where the chemical reaction device is used as a solar cell, the electrolyte solution control unit 61 discharges the first electrolyte solution 23a from the first electrolytic cell 25 or the second electrolyte solution 23b from the second electrolytic cell 26 and fills the first electrolytic cell 25 or second electrolytic cell 26 with air so no current flows in the first electrolyte solution 23a or second electrolyte solution 23b.

The second electrode 11 physically divides the electrolytic cell 21 into the first electrolytic cell 25 and the second electrolytic cell 26. The reverse surface of the second electrode 11 is arranged on the side of the second electrolytic cell 26 and stored in the second electrolytic cell 26. At this time, the obverse surface of the second electrode 11 is arranged on the side of the first electrolytic cell 25. By forming an insulating layer (not shown) on the obverse surface of the second electrode 11, the second electrode 11 and the first electrolyte solution 23a can electrically be insulated to suppress a reaction between them. The reaction may be suppressed by substituting the first electrolyte solution 23a with a nonconductive liquid or gas. Even if the second electrode 11 and the first electrolyte solution 23a are not insulated, the reaction can be suppressed by adjusting the reaction potential of the catalyst. That is, the reaction potential of the catalyst is set to such a potential that does not cause a reaction between the second electrode 11 and the first electrolyte solution 23a. Especially when a plurality of oxidation electrodes and reduction electrodes (to be described later) are provided, this can be implemented by adjusting the reaction potential of each catalyst.

The second electrode 11 has an ion moving path in its exposed portion. The ion moving path is formed from, for example, a plurality of pores extending from the obverse surface to the reverse surface. The pores selectively pass only ions (for example, H ions ($H^+$)) generated by the oxidation reaction of the first electrode 16 in the first electrolytic cell 25 to the second electrolytic cell 26. The ions passed through the pores are converted into $O_2$, $H_2$, an organic compound, or the like by the reduction reaction of the second electrode 11 in the second electrolytic cell 26.

Each pore need only have a size to pass an ion. For example, the lower limit of the diameter (equivalent circle diameter) of the pore is preferably 0.3 nm or more. An area ratio S1/S2 of a total area S1 of the plurality of pores to an area S2 of an ion permeable member 21a is 0.9 or less, preferably, 0.6 or less so as not to lower the mechanical strength. The pore need not always have a circular shape and may have an elliptic shape, triangular shape, or rectangular shape. The arrangement pattern of the pores is not limited to a rectangular grid and may be a triangular grid or random. Each pore may be filled with an ion exchange membrane 19. Examples of the ion exchange membrane are a cation exchange membrane such as Nafion or Flemion and an anion exchange membrane such as Neosepta or Selemion. Each pore may be filled with a glass filter or agar.

Note that the second electrode 11 may have a plurality of slits extending from the obverse surface to the reverse surface and filled with the ion exchange membrane 19 in place of pores. The slits selectively pass only ions (for example, H ions ($H^+$)) generated by the oxidation reaction of the first electrode 16 in the first electrolytic cell 25 to the second electrolytic cell 26.

Movement of ions may be promoted by providing a pump in the ion moving path.

When a valve is provided in the ion moving path, a state in which each of the electrolytic cells (the first electrolytic cell 25 and the second electrolytic cell 26) is filled with the electrolyte solution, and a state in which each electrolytic cell is not filled with the electrolyte solution (each electrolytic cell is filled with air) can be formed.

In the first modification, the electrolytic cell 21 is divided into the first electrolytic cell 25 and the second electrolytic cell 26. This makes it possible to fill the electrolytic cells with different electrolyte solutions (the first electrolyte solution 23a and the second electrolyte solution 23b) that readily react. When the electrolytic cell 21 is divided into the first electrolytic cell 25 and the second electrolytic cell 26, the oxidation reaction occurs on the side of the first electrolytic cell 25, and the reduction reaction occurs on the side of the second electrolytic cell 26. As a result, it is possible to collect the product (for example, $O_2$) of the oxidation reaction in the first electrolytic cell 25 and collect the product (for example, CO) of the reduction reaction in the second electrolytic cell 26. That is, the product of the oxidation reaction and that of the reduction reaction can separately be collected.

In addition, the electrolyte solutions in the first electrolytic cell 25 and the second electrolytic cell 26 can be changed to cause different reactions between a case where the chemical reaction device is used as an electrolytic system and a case where the device is used as an artificial photosynthesis system. This makes it possible to cause an optimum reaction in correspondence with a reaction current density that changes depending on the light intensity, surplus power, and the like.

Figure 8:
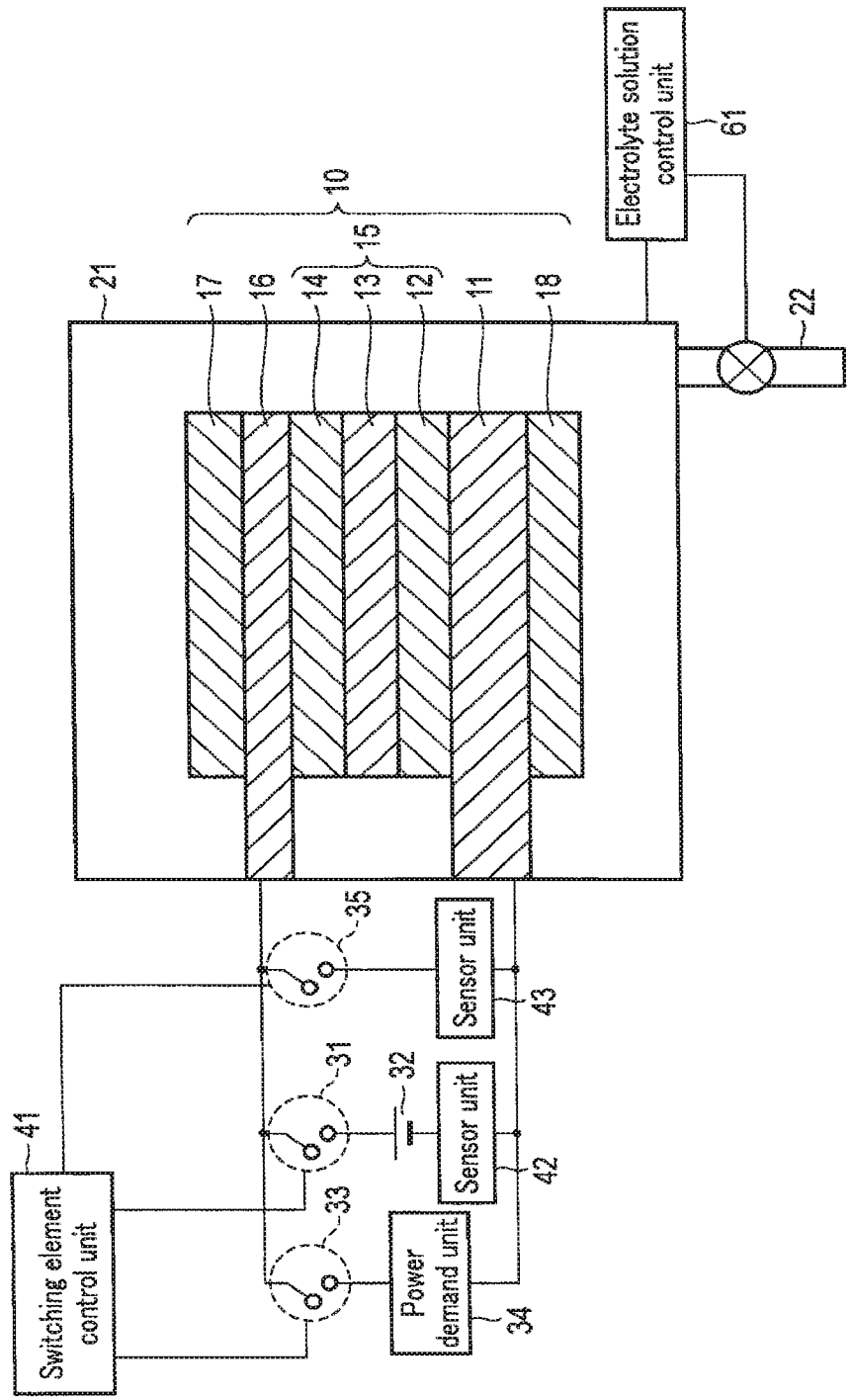
FIG. 8 is a schematic view showing the arrangement of the second modification of the chemical reaction device according to the first embodiment.

FIG. 8 is a schematic view showing the arrangement of the second modification of the chemical reaction device according to the first embodiment.

As shown in FIG. 8, in the second modification of the chemical reaction device according to the first embodiment, sensor units 42 and 43 are electrically connected between the first electrode 16 and the second electrode 11.

The sensor unit 42 is electrically connected between the first electrode 16 and the second electrode 11 via the switching element 31 and the external power supply 32. In other words, the first switching element 31 is formed between the sensor unit 42 and the first electrode 16 or second electrode 11. When the first switching element 31 is turned on, the first electrode 16 and the second electrode 11 are electrically connected via the external power supply 32 and the sensor unit 42. On the other hand, when the first switching element 31 is turned off, the first electrode 16 and the second electrode 11 are electrically disconnected via the external power supply 32 and the sensor unit 42. That is, the sensor unit 42 functions when the chemical reaction device is mainly used as an electrolytic system.

The sensor unit 43 is electrically connected between the first electrode 16 and the second electrode 11 via a third switching element 35. In other words, the third switching element 35 is formed between the sensor unit 43 and the first electrode 16 or second electrode 11. When the third switching element 35 is turned on, the first electrode 16 and the second electrode 11 are electrically connected via the sensor unit 43. On the other hand, when the third switching element 35 is turned off, the first electrode 16 and the second electrode 11 are electrically disconnected via the sensor unit 43. That is, the sensor unit 43 functions when the chemical reaction device is mainly used as an artificial photosynthesis system.

In the case of, for example, the electrolytic system, using the electromotive force of the external power supply 32, the sensor unit 42 captures an electrical signal obtained by the reaction between the electrolyte solution 23 and the first electrode 16 and the second electrode 11. In the case of the electrolytic system, the sensor unit 42 thus measures pH of the electrolyte solution 23, the concentration of the electrolyte solution 23, the composition of the electrolyte solution 23, the pressure in the electrolytic cell 21, the temperature in the electrolytic cell 21, the light intensity, and the like.

In the case of, for example, the artificial photosynthesis system, using the electromotive force of the photovoltaic layer 15, the sensor unit 43 captures an electrical signal obtained by the reaction between the electrolyte solution 23 and the first electrode 16 and the second electrode 11. In the case of the artificial photosynthesis system, the sensor unit 43 thus measures pH of the electrolyte solution 23, the concentration of the electrolyte solution 23, the composition of the electrolyte solution 23, the pressure in the electrolytic cell 21, the temperature in the electrolytic cell 21, the light intensity, and the like. The sensor unit 43 can operate without a power supply because it uses the electromotive force of the photovoltaic layer 15. If reactions are caused by two types of electrolyte solutions, as shown in FIG. 7, the sensor unit 43 can use the liquid junction potential. The sensor unit 43 can obtain information such as pH and the density of the electrolyte solution from the liquid junction potential. The sensor unit 43 can use the liquid junction potential as a power supply.

Note that when the chemical reaction device is used as an artificial photosynthesis system, the sensor unit 43 may be unable to function by the electromotive force of the photovoltaic layer 15 because of a low light intensity. In this case, the sensor unit 42 may temporarily be caused to function by the external power supply 32 to measure various requirements. This also applies to a case where the chemical reaction device is used as an electrolytic system. That is, when the chemical reaction device is used as an electrolytic system, the sensor unit 43 may temporarily be caused to function by the electromotive force of the photovoltaic layer 15 to measure various requirements.

In particular, the sensor units 42 and 43 are suitable for a structure that generates light by a reaction, a structure that causes a reaction by light, and a structure that changes a reaction by light. Note that the light is not limited to visible light, and an electromagnetic wave or radiation that acts on the photovoltaic layer 15 may be used. By capturing an electrical signal, the sensor units 42 and 43 can also detect a change in light absorption due to a reaction or the conditions (pH, concentration, and composition) of the electrolyte solution 23 according to light or radiation generated by the reaction and the progress of the reaction.

In the second modification, the sensor units 42 and 43 measure pH of the electrolyte solution 23, the concentration of the electrolyte solution 23, the composition of the electrolyte solution 23, the pressure in the electrolytic cell 21, the temperature in the electrolytic cell 21, the light intensity, and the like. It is therefore possible to appropriately adjust the conditions of the electrolyte solution 23 and the electrolytic cell 21 to promote the electrolytic reaction.

Note that the following arrangements may be applied as other modifications.

By the electromotive force generated by the photovoltaic layer 15 in the artificial photosynthesis system, light energy may be stored as the reductant of a substance. In other words, a substance may be reduced by light energy, and the reduced substance may be stored as reduction energy. The reductant here indicates a substance having a reducing force. In other words, the reductant is a substance that loses electrons in itself when oxidized, and gives the electrons to another substance and reduces it. Examples of conversion from light energy to reduction energy are conversion from trivalent iron ions ($Fe^{3-}$) to divalent ions ($Fe^{2-}$) by light energy and conversion from monovalent iodine ions ($I^-$) to trivalent ions ($I^{3-}$) by light energy. $H^-$ may be stored as the reductant.

In this way, a reductant obtained by the artificial photosynthesis system may be further reduced by the electromotive force generated by the external power supply 32 the electrolytic system. This enables conversion to a reductant with a higher energy density.

In addition, light energy may be obtained from reduction energy by causing a reaction to oxidize the reductant obtained by the artificial photosynthesis system and return it to the original substance. That is, an artificial photosynthesis system having a storage function can be formed. The storage function can also be obtained by causing interaction between electrodes using a compound such as a lithium compound, like a normal battery.

The device can also be used as a fuel cell. More specifically, water is decomposed by light energy to generate hydrogen and oxygen. The resultant oxygen and hydrogen share at least one electrode, thereby generating water. Power can thus be obtained. That is, a fuel cell can be integrated with the artificial photosynthesis system. Note that the reaction efficiency can be improved by providing a channel in the electrolytic cell 21, like a normal fuel cell. A solid polymer membrane used in a solid polymer fuel cell may be formed between the first electrode 16 and the second electrode 11. Heat generated upon production of electric power or heat of the electrolyte warmed by sunlight may be used as a use medium. The use medium of heat is not limited to the electrolyte, and another heating medium may be provided on the second electrode 11 or a copper tube (not shown) in the electrolyte solution 23.

2. Second Embodiment

A chemical reaction device according to the second embodiment will be described below with reference to FIGS. 9, 10, 11, 12, 13, 14, and 15.

In the chemical reaction device according to the second embodiment, not only a stack 10 including a first electrode 16, a photovoltaic layer 15, and a second electrode 11 but also a third electrode 51 that faces the second electrode 11 at a distance are arranged in an electrolytic cell 21. An external power supply 32 is electrically connected between the second electrode 11 and the third electrode 51, and the chemical reaction device can function as an electrolytic system by the second electrode 11, the third electrode 51, and the external power supply 32. The second embodiment will be described below.

Note that in the second embodiment, a description of the same points as in the first embodiment will appropriately be omitted, and different points will mainly be explained.

2-1. Arrangement of Second Embodiment

FIG. 9 is a schematic view showing an example of the arrangement of the chemical reaction device according to the second embodiment. Note that FIG. 9 illustrates the sectional structures of the stack 10, the third electrode 51, and the electrolytic cell 21.

As shown in FIG. 9, the chemical reaction device according to the second embodiment is different from the first embodiment in that not only the first electrode 16 and the second electrode 11 but also the third electrode 51 are provided.

The third electrode 51 is stored in the electrolytic cell 21 and arranged on the side opposite to the light irradiation side with respect to the second electrode 11 while facing the second electrode 11. The third electrode 51 is formed from a metal plate of, for example, Cu, Al, Ti, Ni, Fe, or Ag or an alloy plate of, for example, SUS containing at least one of them. The third electrode 51 may be made of a conductive resin or the like. The third electrode 51 may be formed from a semiconductor substrate such as Si or Ge.

The third electrode 51 is arranged on the side opposite to the light irradiation side, and therefore has no particular limit on its light transmission properties, shape, and the like.

A third catalyst (not shown) may be formed on the obverse surface of the third electrode 51. The third catalyst is provided to increase chemical reactivity (oxidation reactivity) near the obverse surface of the third electrode 51. When an aqueous solution, that is, a solution containing $H_2O$ is used as an electrolyte solution 23, the third electrode 51 oxidizes $H_2O$ to generate $O_2$ and $H^+$. For this purpose, the third catalyst is made of a material that decreases activation energy to oxidize $H_2O$. In other words, the third catalyst is made of a material that lowers an overvoltage upon oxidizing $H_2O$ and generating $O_2$ and $H^+$. Examples of the material are a binary metal oxide such as Mn—O, Ir—O, Ni—O, Co—O, Fe—O, Sn—O, In—O, or Ru—O, ternary metal oxide such as Ni—Co—O, Ni—Fe—O, La—Co—O, Ni—La—O, or Sr—Fe—O, a quaternary metal oxide such as Pb—Ru—Ir—O, or La—Sr—Co—O, and a metal complex such as an Ru complex or an Fe complex. The third catalyst need not always have a membrane shape, and may have a lattice shape, grain shape, or wire shape.

The external power supply 32 is electrically connected between the second electrode 11 and the third electrode 51 via a first switching element 31. In other words, the first switching element 31 is formed between the external power supply 32 and the second electrode 11 or the third electrode 51. When the first switching element 31 is turned on, the second electrode 11 and the third electrode 51 are electrically connected via the external power supply 32. On the other hand, when the first switching element 31 is turned off, the second electrode 11 and the third electrode 51 are electrically disconnected via the external power supply 32. The third electrode 51 is connected to the anode side of the external power supply 32, and the second electrode 11 is connected to the cathode side. In a case with surplus power, the external power supply 32 supplies power to the second electrode 11 and the third electrode 51, as will be described later in detail.

A switching element control unit 41 on/off-controls the first switching element 31 and a second switching element 33 in accordance with conditions such as the presence/absence of surplus power more than the demand of a power demand unit 34 and the presence/absence of sunlight energy.

More specifically, in a case with surplus power and sunlight energy, the switching element control unit 41 turns off the first switching element 31 and the second switching element 33. The first electrode 16 and the second electrode 11 are thus electrically connected via only the photovoltaic layer 15. As a result, electromotive force generated by the photovoltaic layer 15 causes electrolysis in the first electrode 16 and the second electrode 11, and chemical energy is generated. That is, the chemical reaction device functions as an artificial photosynthesis system.

On the other hand, in a case with surplus power but without sunlight energy, the switching element control unit 41 turns off the second switching element 33 and turns on the first switching element 31. The second electrode 11 and the third electrode 51 are thus electrically connected via the external power supply 32. As a result, electromotive force generated by the external power supply 32 causes electrolysis in the second electrode 11 and the third electrode 51, and chemical energy is generated. That is, the chemical reaction device functions as an electrolytic system.

In a case without surplus power, the switching element control unit 41 turns off the first switching element 31 and turns on the second switching element 33. The photovoltaic layer 15 and the power demand unit 34 are thus electrically connected. As a result, power is supplied to the power demand unit 34 by electromotive force generated by the photovoltaic layer 15. That is, the chemical reaction device functions as a solar cell.

Note that each of the artificial photosynthesis system, the electrolytic system, and the solar cell does not necessarily operate solely. The artificial photosynthesis system, the electrolytic system, and the solar cell can simultaneously operate (hybrid operation) in balance. They can operate in an arbitrary combination so as to, for example, obtain electricity while making an artificial photosynthesis reaction or cause the artificial photosynthesis system and the electrolytic system to do the hybrid operation by the external power supply and sunlight. At this time, a device that causes them to operate while electrically adjusting their voltages and currents is needed. If there exist a plurality of oxidation electrodes and a plurality of reduction electrodes, more combinations are possible. It is also possible to cause two reactions simultaneously. For example, formic acid can be generated by the artificial photosynthesis system, and the formic acid generated by the artificial photosynthesis system can be converted into methanol in the same electrolyte between other electrodes by supplying power from the external power supply. Such a generation reaction can also be caused arbitrarily.

2-2. Operation of Second Embodiment

Figure 10:
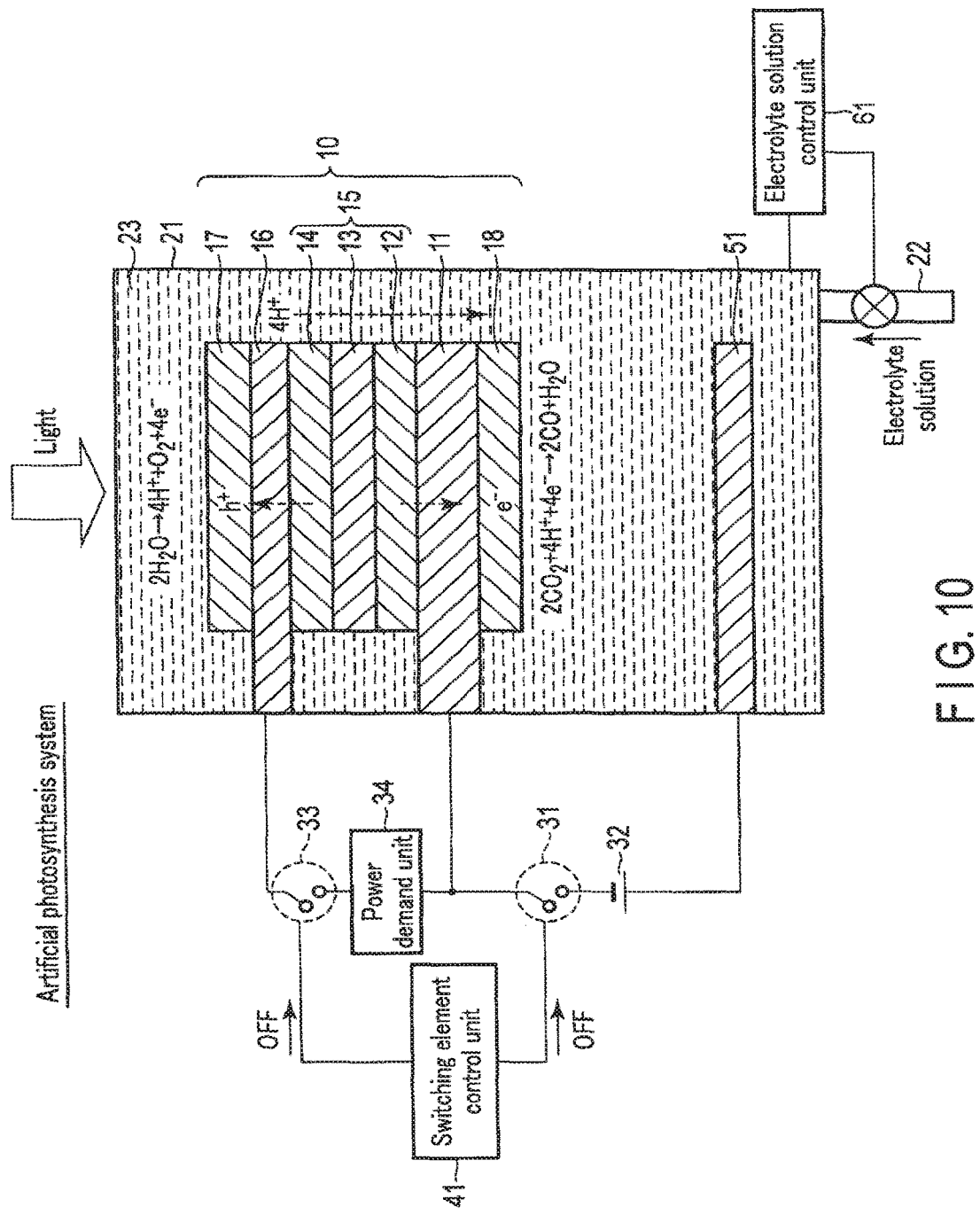
FIG. 10 is a view showing the artificial photosynthesis system operation of the chemical reaction device according to the second embodiment.

FIG. 10 is a view showing the artificial photosynthesis system operation of the chemical reaction device according to the second embodiment. The artificial photosynthesis system is used mainly in a case with surplus power and sunlight energy.

As shown in FIG. 10, when the chemical reaction device is used as the artificial photosynthesis system, the switching element control unit 41 turns off the first switching element 31 and the second switching element 33. The second electrode 11 and the third electrode 51 are thus electrically disconnected via the external power supply 32. In addition, the first electrode 16 and the second electrode 11 are electrically disconnected via the power demand unit 34.

The electrolyte solution control unit 61 controls the amount of the electrolyte solution 23 in the electrolytic cell 21 so as to immerse the first electrode 16 and the second electrode 11 in the electrolyte solution 23. The electrolyte solution 23 is thus injected into the electrolytic cell 21 via a tube 22, and the electrolytic cell 21 is filled with the electrolyte solution 23. Note that the electrolytic cell 21 need not always be filled with the electrolyte solution 23, and immersing at least part of the first electrode 16 and the second electrode 11 in the electrolyte solution 23 suffices.

When light enters from above in this state, the same reaction as in the first embodiment occurs. That is, a reaction represented by formula (1) occurs near the obverse surface of the first electrode 16 in contact with the electrolyte solution 23, and a reaction represented by formula (2) occurs near the reverse surface of the second electrode 11.

As indicated by formula (1), near the obverse surface of the first electrode 16, $H_2O$ is oxidized (loses electrons), and $O_2$ and $H^+$ are generated. $H^+$ generated on the side of the first electrode 16 moves to the side of the second electrode 11.

As indicated by formula (2), near the reverse surface of the second electrode 11, $CO_2$ reacts with $H^+$ that has moved, and CO and $H_2O$ are generated. That is, $CO_2$ is reduced (obtains electrons).

As described above, in the artificial photosynthesis system, electromotive force is generated in the photovoltaic layer 15 by sunlight energy. The electromotive force causes an oxidation reduction reaction (electrolytic reaction) on the obverse surface of the first electrode 16 and the reverse surface of the second electrode 11, and chemical energy is generated. That is, sunlight energy can be converted into chemical energy.

Figure 11:
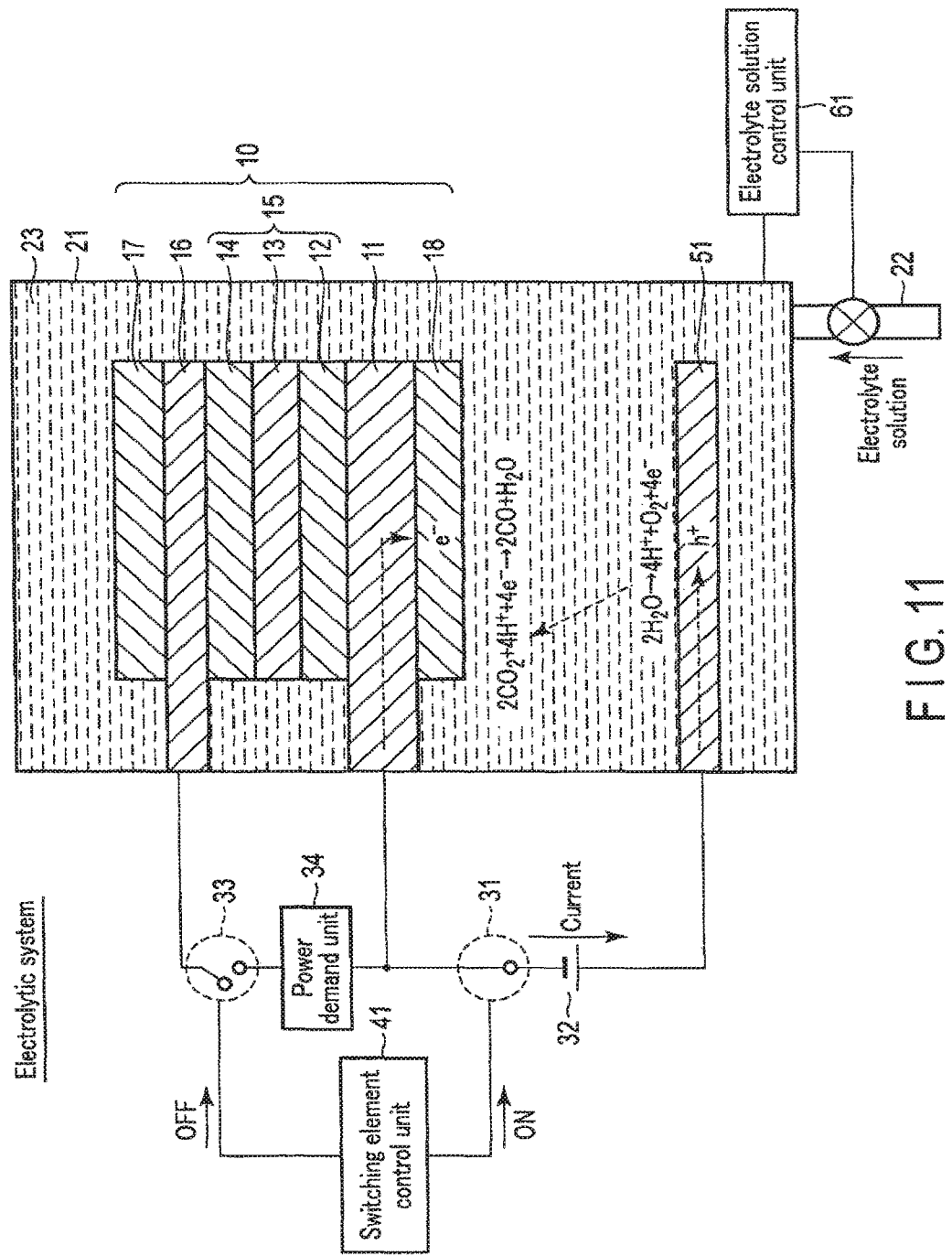
FIG. 11 is a view showing the electrolytic system operation of the chemical reaction device according to the second embodiment.

FIG. 11 is a view showing the electrolytic system operation of the chemical reaction device according to the second embodiment. The electrolytic system is used mainly in a case with surplus power but without sunlight energy. For example, the electrolytic system can be used at nighttime.

As shown in FIG. 11, when the chemical reaction device is used as the electrolytic system, the switching element control unit 41 turns on the first switching element 31. The second electrode 11 and the third electrode 51 are thus electrically connected via the external power supply 32. On the other hand, the switching element control unit 41 turns off the second switching element 33. The first electrode 16 and the second electrode 11 are thus electrically disconnected via the power demand unit 34.

The electrolyte solution control unit 61 controls the amount of the electrolyte solution 23 in the electrolytic cell 21 so as to immerse the second electrode 11 and the third electrode 51 in the electrolyte solution 23. The electrolyte solution 23 is thus injected into the electrolytic cell 21 via the tube 22, and the electrolytic cell 21 is filled with the electrolyte solution 23. Note that the electrolytic cell 21 need not always be filled with the electrolyte solution 23, and immersing at least part of the second electrode 11 and the third electrode 51 in the electrolyte solution 23 suffices.

When electromotive force is generated in the external power supply 32 in this state, holes move to the side of the third electrode 51 connected to the anode side of the external power supply 32. On the other hand, electrons move to the side of the second electrode 11 connected to the cathode side of the external power supply 32. The electrons moved to the second electrode 11 that is the electrode on the cathode side are used in a reduction reaction near the reverse surface of the second electrode 11. On the other hand, the holes generated in the photovoltaic layer 15 and moved to the third electrode 51 that is the electrode on the anode side are used in an oxidation reaction near the obverse surface of the third electrode 51. More specifically, a reaction represented by formula (1) occurs near the obverse surface of the third electrode 51 in contact with the electrolyte solution 23, and a reaction represented by formula (2) occurs near the reverse surface of the second electrode 11.

As indicated by formula (1), near the obverse surface of the third electrode 51, $H_2O$ is oxidized (loses electrons), and $O_2$ and $H^-$ are generated. $H^-$ generated on the side of the third electrode 51 moves to the side of the second electrode 11.

At this time, since the third electrode 51 and the second electrode 11 are mainly formed so as to face each other, the distance between them is relatively short. For this reason, the distance that $H^-$ moves from the third electrode 51 to the second electrode 11 is short. It is therefore possible to efficiently diffuse $H^-$ from the third electrode 51 to the second electrode 11.

As indicated by formula (2), near the reverse surface of the second electrode 11, $CO_2$ reacts with $H^-$ that has moved, and CO and $H_2O$ are generated. That is, $CO_2$ is reduced (obtains electrons).

At this time, the photovoltaic layer 15 needs to have an open circuit voltage equal to or more than the potential difference between the standard oxidation reduction potential of the oxidation reaction that occurs in the third electrode 51 and the standard oxidation reduction potential of the reduction reaction that occurs in the second electrode 11. For example, the standard oxidation reduction potential of the oxidation reaction of formula (1) is 1.23 [V], and the standard oxidation reduction potential of the reduction reaction of formula (2) is −0.1 [V]. For this reason, the open circuit voltage of the photovoltaic layer 15 needs to be 1.33 [V] or more. Note that more preferably, the open circuit voltage needs to be equal to or more than the potential difference including overvoltages. More specifically, for example, if the overvoltage of the oxidation reaction of formula (1) and that of the reduction reaction of formula (2) are 0.2 [V] each, the open circuit voltage is preferably 1.73 [V] or more.

As described above, in the electrolytic system, electromotive force is generated in the external power supply 32 by the electric energy of surplus power. The electromotive force causes an oxidation reduction reaction (electrolytic reaction), and chemical energy is generated. That is, electric energy can be converted into chemical energy.

FIG. 12 a view showing the solar cell operation of the chemical reaction device according to the second embodiment. FIG. 13 is a view showing a modification of the solar cell operation of the chemical reaction device according to the second embodiment. The solar cell is used mainly in a case without surplus power.

As shown in FIG. 12, when the chemical reaction device is used as the solar cell, the switching element control unit 41 turns off the first switching element 31. The second electrode 11 and the third electrode 51 are thus electrically disconnected via the external power supply 32. On the other hand, the switching element control unit 41 turns on the second switching element 33. The first electrode 16 and the second electrode 11 are thus electrically connected via the power demand unit 34.

At this time, it is preferable that ions do not move between the first electrode 16 and the second electrode 11 via the electrolyte solution 23. That is, preferably, no current flows via the electrolyte solution 23. This is because discharge to the power demand unit 34 occurs at the same time as power generation by the photovoltaic layer 15. To do this, the electrolyte solution control unit 61 controls the amount of the electrolyte solution 23 in the electrolytic cell 21 so as not to immerse the first electrode 16 and the second electrode 11 in the electrolyte solution 23. The electrolyte solution 23 is thus discharged from the electrolytic cell 21 via the tube 22, and the electrolytic cell 21 is filled with air.

Note that the electrolytic cell 21 need not always be filled with air, and prohibiting at least part of the first electrode 16 or part of the second electrode 11 from being immersed in the electrolyte solution 23 suffices. At this time, as shown in FIG. 13, the electrolytic cell 21 may partially be filled with a gas (for example, $O_2$) generated by the above-described artificial photosynthesis system or electrolytic system. In this case, the electrolyte solution 23 need not be discharged from the electrolytic cell 21 via the tube 22. That is, it is unnecessary to use a pump and the like provided on the tube 22, and energy loss can be reduced. In this case, the first electrode 16 needs to be arranged on the side opposite to the gravity. In addition, the first electrode 16 and the second electrode 11 may be separated by a partition to prevent ion movement via the electrolyte solution 23. On the other hand, a tube that enables ion movement may be provided between the first electrode 16 and the second electrode 11 while separating the electrode themselves, and a valve-like element may be provided in the tube.

When entering from above in this state, irradiation light passes through the first electrode 16 and reaches the photovoltaic layer 15. Upon absorbing the light, the photovoltaic layer 15 generates electrons and holes as counterparts, and separates them. That is, in each of the photovoltaic layers (a first photovoltaic layer 12, a second photovoltaic layer 13, and a third photovoltaic layer 14), the electrons moves to the side of the n-type semiconductor layer (the side of the second electrode 11), and holes generated as the counterparts of the electrons move to the side of the p-type semiconductor layer (the side of the first electrode 16) so that charge separation occurs. Electromotive force is thus generated in the photovoltaic layer 15. Power can be supplied to the power demand unit 34 by the electromotive force generated by the photovoltaic layer 15.

As described above, in the solar cell, electromotive force is generated in the photovoltaic layer 15 by sunlight energy. By the electromotive force, electric energy is generated. That is, sunlight energy can be converted into electric energy.

2-3. Effects of Second Embodiment

According to the second embodiment, the same effects as in the first embodiment can be obtained.

Additionally, according to the second embodiment, not only the stack 10 including the first electrode 16, the photovoltaic layer 15, and the second electrode 11 but also the third electrode 51 that faces the second electrode 11 at a distance are stored in the electrolytic cell 21. When the external power supply 32 is electrically connected between the second electrode 11 and the third electrode 51, the chemical reaction device can function as an electrolytic system.

At this time, since the third electrode 51 and the second electrode 11 are formed so as to face each other, the distance between them is relatively short. For this reason, the distance that $H^+$ generated in the third electrode 51 moves to the second electrode 11 is short. It is therefore possible to efficiently diffuse $H^-$ to be used for the reaction in the second electrode 11 from the third electrode 51 to the second electrode 11.

The third electrode 51 is arranged on the side opposite to the light irradiation side with respect to the photovoltaic layer 15. For this reason, transmission properties need not taken into consideration for the material of the third electrode 51, and the shape is also not particularly limited. That is, the material and shape of the third electrode 51 can be set in consideration of only the reaction efficiency.

Furthermore, according to, for example, a reaction current density that changes between a case where the chemical reaction device functions as an artificial photosynthesis system and a case where the device functions as an electrolytic system, a third catalyst (not shown) on the obverse surface of the third electrode 51, which is different from a second catalyst 18 and a first catalyst 17, can be used.

Note that the third electrode 51 need not always face the second electrode 11 at a distance. The third electrode 51 may be arranged to be perpendicular to the second electrode 11 in accordance with a structural problem or the like.

The external power supply 32 may be connected not only between the second electrode 11 and the third electrode 51 but also between the second electrode 11 and the first electrode 16 in accordance with surplus power of the external power supply 32. That is, the connection combinations between the external power supply 32 and various switching elements are not limited to those of the example.

2-4. Modifications of Second Embodiment

Figure 14:
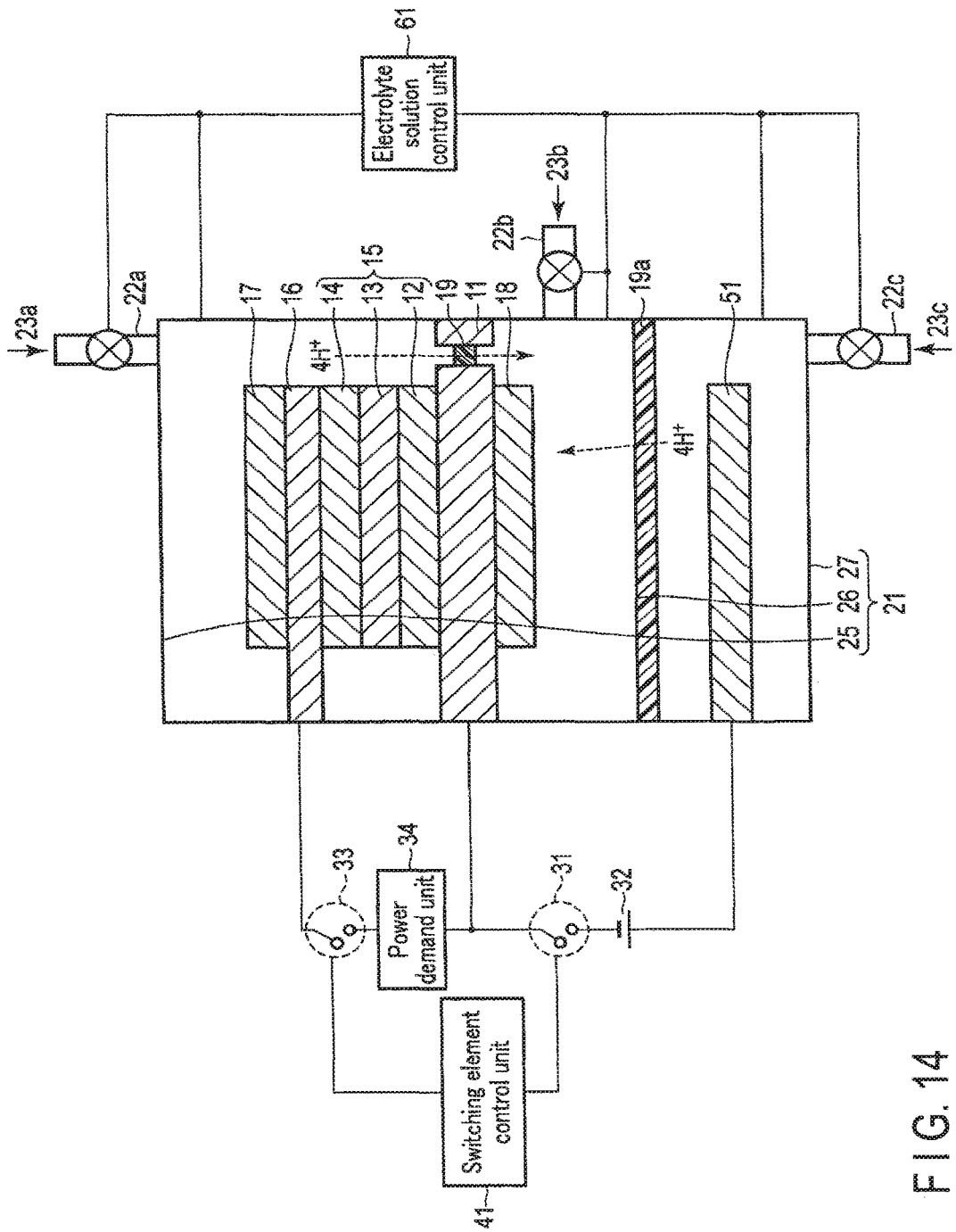
FIG. 14 is a schematic view showing the arrangement of the first modification of the chemical reaction device according to the second embodiment.

FIG. 14 is a schematic view showing the arrangement of the first modification of the chemical reaction device according to the second embodiment.

As shown in FIG. 14, in the first modification of the chemical reaction device according to the second embodiment, the electrolytic cell 21 is physically divided into a first electrolytic cell 25 and a second electrolytic cell 26 by the second electrode 11, and physically divided into the second electrolytic cell 26 and a third electrolytic cell 27 by an ion exchange membrane 19a.

The first electrolytic cell 25 stores a first electrolyte solution 23a inside so as to immerse the obverse surface (first catalyst 17) of the first electrode 16. The first electrolyte solution 23a is a solution containing, for example, $H_2O$. As the solution, a solution containing an arbitrary electrolyte is usable. The solution preferably promotes an oxidation reaction of $H_2O$. The upper surface of the first electrolytic cell 25 is provided with a window portion made of, for example, glass or acryl with a high light transmittance. Irradiation light enters from above the first electrolytic cell 25.

A tube 22a is connected to the first electrolytic cell 25. The tube 22a injects the first electrolyte solution 23a into the first electrolytic cell 25 or discharges the first electrolyte solution 23a from the first electrolytic cell 25.

The second electrolytic cell 26 stores a second electrolyte solution 23b inside so as to immerse the reverse surface (second catalyst 18) of the second electrode 11. The second electrolyte solution 23b is a solution containing, for example, $CO_2$. The second electrolyte solution 23b preferably has a high $CO_2$ absorption. Examples of the solution containing $H_2O$ are aqueous solutions of $NaHCO_3$ and $KHCO_3$. The first electrolyte solution 23a and the second electrolyte solution 23b may be identical solutions. However, since the second electrolyte solution 23b preferably has a high $CO_2$ absorption, different solutions may be used as the first electrolyte solution 23a and the second electrolyte solution 23b. The second electrolyte solution 23b also preferably lowers the reduction potential of $CO_2$, exhibits a high ionic conduction property, and contains a $CO_2$ absorbent that absorbs $CO_2$. An example of an electrolyte solution like this is an ion liquid which is made of a salt containing a cation such as an imidazolium ion or pyridinium ion and an anion such as $BF^{4-}$ or $PF^{6-}$, and is in a liquid state over a broad temperature range, or an aqueous solution of this ion liquid. Another example of the electrolyte solution is an amine solution such as ethanolamine, imidazole, or pyridine, or an aqueous solution of this amine solution. Amine can be any of primary amine, secondary amine, and tertiary amine. Examples of primary amine are methylamine, ethylamine, propylamine, butylamine, pentylamine, and hexylamine. Hydrocarbon of amine may be substituted with alcohol or halogen. Examples of amine in which hydrocarbon is substituted are methanolamine, ethanolamine, and chloromethylamine. An unsaturated bond may also exist. These hydrocarbons similarly apply to secondary amine and tertiary amine. Examples of secondary amine are dimethylamine, diethylamine, dipropylamine, dibutylamine, dipentylamine, dihexylamine, dimethanolamine, diethanolamine, and dipropanolamine. Substituted hydrocarbons may also be different. This similarly applies to tertiary amine. Examples of amines having different hydrocarbons are methylethylamine and methylpropylamine. Examples of tertiary amine are trimethylamine, triethylamine, tripropylamine, tributylamine, trihexylamine, trimethanolamine, triethanolamine, tripropanolamine, tributanolamine, tripropanolamine, triexanolamine, methyldiethylamine, and methyldipropylamine. Examples of the cation of the ion liquid are a 1-ethyl-3-methylimidazolium ion, 1-methyl-3-propylimidazolium ion, 1-butyl-3-methylimidazol ion, 1-methyl-3-pentylimidazolium ion, and 1-hexyl-3-methylimidazolium ion. The 2-position of the imidazolium ion may also be substituted. Examples of the imidazolium ion in which the 2-position is substituted are a 1-ethyl-2,3-dimethylimidazolium ion, 1,2-dimethyl-3-propylimidazolium ion, 1-butyl2,3-dimethylimidazolium ion, 1,2-dimethyl-3-pentylimidazolium ion, and 1-hexyl-2,3-dimethylimidazolium ion. Examples of the pyridinium ion are methylpyridinium, ethylpyridinium, propylpyridinium, butylpyridinium, pentylpyridinium, and hexylpyridinium. In both the imidazolinium ion and pyridinium ion, an alkyl group may be substituted, and an unsaturated bond may exist. Examples of the anion are a fluoride ion, a chloride ion, a bromide ion, an iodide ion, $BF^{4-}$, $PF^{6-}$, $CF_3COO^-$, $CF_3SO^{3-}$, $SCN^-$, $(CF_3SO_2)_3C^-$, bis(trifluoromethoxysulfonyl)imide, bis(trifluoromethoxysulfonyl)imide, and bis(perfluoroethylsulfonyl)imide. It is also possible to use a zweitterion obtained by coupling the cation and anion of the ion liquid by hydrocarbon.

A tube 22b is connected to the second electrolytic cell 26. The tube 22b injects the second electrolyte solution 23b into the second electrolytic cell 26 or discharges the second electrolyte solution 23b from the second electrolytic cell 26.

The third electrolytic cell 27 stores a third electrolyte solution 23c inside so as to immerse the third electrode 51. The third electrolyte solution 23c is the same liquid as the first electrolyte solution 23a, for example, a solution containing, for example, $H_2O$. As the solution, a solution containing an arbitrary electrolyte is usable. The solution preferably promotes an oxidation reaction of $H_2O$.

A tube 22c is connected to the third electrolytic cell 27. The tube 22c injects the third electrolyte solution 23c into the third electrolytic cell 27 or discharges the third electrolyte solution 23c from the third electrolytic cell 27.

The electrolyte solution control unit 61 controls the first electrolyte solution 23a in the first electrolytic cell 25, the second electrolyte solution 23b in the second electrolytic cell 26, and the third electrolyte solution 23c in the third electrolytic cell 27. More specifically, the electrolyte solution control unit 61 measures the amounts of the first electrolyte solution 23a in the first electrolytic cell 25, the second electrolyte solution 23b in the second electrolytic cell 26, and the third electrolyte solution 23c in the third electrolytic cell 27, and controls injection and discharge of the first electrolyte solution 23a by the tube 22a, the second electrolyte solution 23b by the tube 22b, and the third electrolyte solution 23c by the tube 22c.

In a case where the chemical reaction device is used as an artificial photosynthesis system, the electrolyte solution control unit 61 thus fills the first electrolytic cell 25 with the first electrolyte solution 23a and fills the second electrolytic cell 26 with the second electrolyte solution 23b so as to cause a sufficient electrolytic reaction. In a case where the chemical reaction device is used as an electrolytic system, the electrolyte solution control unit 61 thus fills the second electrolytic cell 26 with the second electrolyte solution 23b and fills the third electrolytic cell 27 with the third electrolyte solution 23c so as to cause a sufficient electrolytic reaction. In a case where the chemical reaction device is used as a solar cell, the electrolyte solution control unit 61 discharges the first electrolyte solution 23a or second electrolyte solution 23b from the first electrolytic cell 25 or second electrolytic cell 26 and fills the first electrolytic cell 25 or second electrolytic cell 26 with air so no current flows in the first electrolyte solution 23a or second electrolyte solution 23b.

The second electrode 11 physically divides the electrolytic cell 21 into the first electrolytic cell 25 and the second electrolytic cell 26. The reverse surface of the second electrode 11 is arranged on the side of the second electrolytic cell 26 and stored in the second electrolytic cell 26. At this time, the obverse surface of the second electrode 11 is arranged on the side of the first electrolytic cell 25. By forming an insulating layer (not shown) on the obverse surface of the second electrode 11, the second electrode 11 and the first electrolyte solution 23a can electrically be insulated to suppress a reaction between them. The reaction may be suppressed by substituting the first electrolyte solution 23a with a nonconductive liquid or gas. Even if the second electrode 11 and the first electrolyte solution 23a are not insulated, the reaction can be suppressed by adjusting the reaction potential of the catalyst. That is, the reaction potential of the catalyst is set to such a potential that does not cause a reaction between the second electrode 11 and the first electrolyte solution 23a. Especially when a plurality of oxidation electrodes and reduction electrodes (to be described later) are provided, this can be implemented by adjusting the reaction potential of each catalyst.

The second electrode 11 has an ion moving path in its exposed portion. The ion moving path is formed from, for example, a plurality of pores extending from the obverse surface to the reverse surface. The pores selectively pass only ions (for example, H ions (H⁻)) generated by the oxidation reaction of the first electrode 16 in the first electrolytic cell 25 to the second electrolytic cell 26. The ions passed through the pores are converted into $O_2$, $H_2$, an organic compound, or the like by the reduction reaction of the second electrode 11 in the second electrolytic cell 26.

Each pore need only have a size to pass an ion. For example, the lower limit of the diameter (equivalent circle diameter) of the pore is preferably 0.3 nm or more. An area ratio S1/S2 of a total area S1 of the plurality of pores to an area S2 of an ion permeable member 21a is 0.9 or less, preferably, 0.6 or less so as not to lower the mechanical strength. The pore need not always have a circular shape and may have an elliptic shape, triangular shape, or rectangular shape. The arrangement pattern of the pores is not limited to a rectangular grid and may be a triangular grid or random. Each pore may be filled with an ion exchange membrane 19. Examples of the ion exchange membrane are a cation exchange membrane such as Nafion or Flemion and an anion exchange membrane such as Neosepta or Selemion. Each pore may be filled with a glass filter or agar.

Note that the second electrode 11 may have a plurality of slits extending from the obverse surface to the reverse surface and filled with the ion exchange membrane 19 in place of pores. The slits selectively pass only ions (for example, H ions (H⁻)) generated by the oxidation reaction of the first electrode 16 in the first electrolytic cell 25 to the second electrolytic cell 26.

Movement of ions may be promoted by providing a pump in the ion moving path.

The ion exchange membrane 19a physically divides the electrolytic cell 21 into the second electrolytic cell 26 and the third electrolytic cell 27. The obverse surface of the ion exchange membrane 19a is arranged on the side of the second electrolytic cell 26, and the reverse surface of the ion exchange membrane 19a is arranged on the side of the third electrolytic cell 27. The ion exchange membrane 19a selectively passes only ions (for example, H ions (H⁻)) generated by the oxidation reaction of the third electrode 51 in the third electrolytic cell 27 to the second electrolytic cell 26. The ions passed through the ion exchange membrane 19a are converted into $O_2$, $H_2$, an organic compound, or the like by the reduction reaction of the second electrode 11 in the second electrolytic cell 26. Examples of the ion exchange membrane 19a are a cation exchange membrane such as Nafion or Flemion and an anion exchange membrane such as Neosepta or Selemion.

In the first modification, the electrolytic cell 21 divided into the first electrolytic cell 25, the second electrolytic cell 26, and the third electrolytic cell 27. This makes it possible to fill the electrolytic cells with different electrolyte solutions (the first electrolyte solution 23a, the second electrolyte solution 23b, and the third electrolyte solution 23c) that readily react. When the electrolytic cell 21 is divided into the first electrolytic cell 25, the second electrolytic cell 26, and the third electrolytic cell 27, the oxidation reaction occurs in the first electrolytic cell 25 and the third electrolytic cell 27, and the reduction reaction occurs in the second electrolytic cell 26. As a result, it is possible to collect the product (for example, $O_2$) of the oxidation reaction in the first electrolytic cell 25 and the third electrolytic cell 27 and collect the product (for example, CO) of the reduction reaction in the second electrolytic cell 26. That is, the product of the oxidation reaction and that of the reduction reaction can separately be collected.

In addition, the electrolyte solutions may be changed in accordance with, for example, the reaction current density, electrode, or reaction. For example, the first electrolyte solution 23a and the third electrolyte solution 23c causes the reduction reaction of $H_2O$. The third electrolyte solution 23c causes a reaction by the external power supply 32. Hence, the reaction current density in then third electrolyte solution 23c can arbitrarily be changed. It is therefore possible to select an optimum electrolyte solution in accordance with the reaction current density. For example, since the semiconductor layer (photovoltaic layer 15) is immersed in the first electrolyte solution 23a, preferably, the first electrolyte solution 23a does not erode the semiconductor layer. On the other hand, this limitation is not imposed on the third electrolyte solution 23c. Hence, a different electrolyte solution may be used as the third electrolyte solution 23c.

FIG. 15 is a schematic view showing the arrangement of the second modification of the chemical reaction device according to the second embodiment.

As shown in FIG. 15, in the second modification of the chemical reaction device according to the second embodiment, a sensor unit 43 is electrically connected between the first electrode 16 and the second electrode 11, and a sensor unit 42 is electrically connected between the second electrode 11 and the third electrode 51.

The sensor unit 42 is electrically connected between the second electrode 11 and the third electrode 51 via the switching element 31 and the external power supply 32. In other words, the first switching element 31 is formed between the sensor unit 42 and the second electrode 11 or third electrode 51. When the first switching element 31 is turned on, the second electrode 11 and the third electrode 51 are electrically connected via the external power supply 32 and the sensor unit 42. On the other hand, when the first switching element 31 is turned off, the second electrode 11 and the third electrode 51 are electrically disconnected via the external power supply 32 and the sensor unit 42. That is, the sensor unit 42 functions when the chemical reaction device is mainly used as an electrolytic system.

The sensor unit 43 is electrically connected between the first electrode 16 and the second electrode 11 via a third switching element 35. In other words, the third switching element 35 is formed between the sensor unit 43 and the first electrode 16 or second electrode 11. When the third switching element 35 is turned on, the first electrode 16 and the second electrode 11 are electrically connected via the sensor unit 13. On the other hand, when the third switching element 35 is turned off, the first electrode 16 and the second electrode 11 are electrically disconnected via the sensor unit 43. That is, the sensor unit 43 functions when the chemical reaction device is mainly used as an artificial photosynthesis system.

In the case of, for example, the electrolytic system, using the electromotive force of the external power supply 32, the sensor unit 42 captures an electrical signal obtained by the reaction between the electrolyte solution 23 and the second electrode 11 and the third electrode 51. In the case of the electrolytic system, the sensor unit 42 thus measures pH of the electrolyte solution 23, the concentration of the electrolyte solution 23, the composition of the electrolyte solution 23, the pressure in the electrolytic cell 21, the temperature in the electrolytic cell 21, the light intensity, and the like.

In the case of, for example, the artificial photosynthesis system, using the electromotive force of the photovoltaic layer 15, the sensor unit 43 captures an electrical signal obtained by the reaction between the electrolyte solution 23 and the first electrode 16 and the second electrode 11. In the case of the artificial photosynthesis system, the sensor unit 43 thus measures pH of the electrolyte solution 23, the concentration of the electrolyte solution 23, the composition of the electrolyte solution 23, the pressure in the electrolytic cell 21, the temperature in the electrolytic cell 21, the light intensity, and the like. The sensor unit 43 can operate without a power supply because it uses the electromotive force of the photovoltaic layer 15.

Note that when the chemical reaction device is used as an artificial photosynthesis system, the sensor 43 may be unable to function by the electromotive force of the photovoltaic layer 15 because of a low light intensity. In this case, the sensor unit 42 may temporarily be caused to function by the external power supply 32 to measure various requirements. This also applies to a case where the chemical reaction device is used as an electrolytic system. That is, when the chemical reaction device is used as an electrolytic system, the sensor unit 43 may temporarily be caused to function by the electromotive force of the photovoltaic layer 15 to measure various requirements.

In the second modification, the sensor units 42 and 43 measure pH of the electrolyte solution 23, the concentration of the electrolyte solution 23, the composition of the electrolyte solution 23, the pressure in the electrolytic cell 21, the temperature in the electrolytic cell 21, the light intensity, and the like. It is therefore possible to appropriately adjust the conditions of the electrolyte solution 23 and the electrolytic cell 21 to promote the electrolytic reaction.

3. Third Embodiment

A chemical reaction device according to the third embodiment will be described below with reference to FIGS. 16, 17, 18, 19, 20, and 21.

The third embodiment is a modification of the second embodiment. In the chemical reaction device according to the third embodiment, a third catalyst 52 and a third electrode 51 are formed on an ion exchange membrane 19b on the reverse surface of a stack 10 (second catalyst 18). A second electrolytic cell channel 26a is formed in a second electrode 11, and a third electrolytic cell channel 27a is formed is the third electrode 51. This makes it possible to cause a reduction reaction in the second electrolytic cell channel 26a and an oxidation reaction in the third electrolytic cell channel 27a. The third embodiment will be described below in detail.

Note that in the third embodiment, a description of the same points as in the above embodiments will appropriately be omitted, and different points will mainly be explained.

3-1. Arrangement of Third Embodiment

Figure 16:
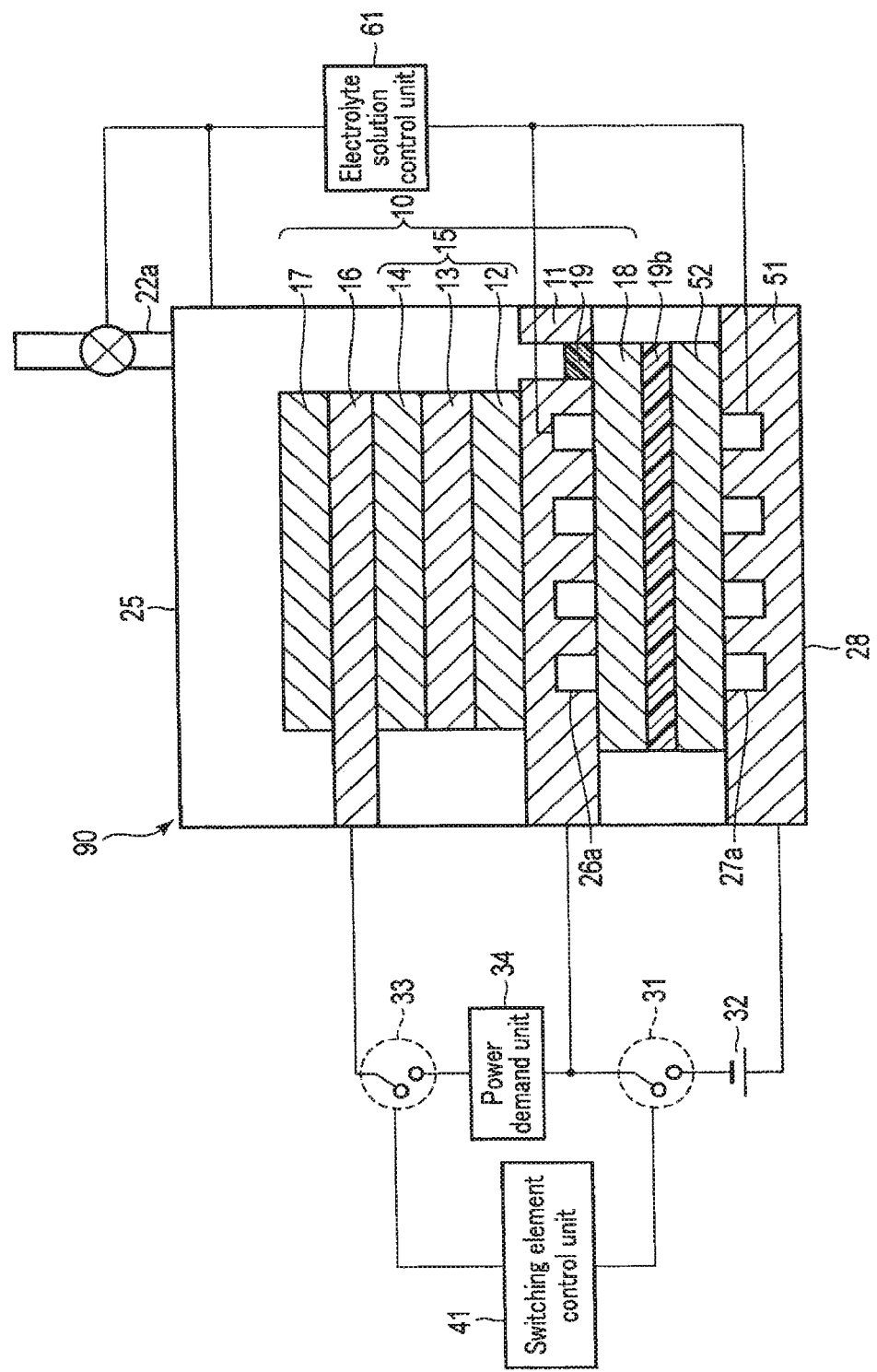
FIG. 16 is a schematic view showing an example of the arrangement of a chemical reaction device according to the third embodiment.

FIG. 16 is a schematic view showing an example of the arrangement of the chemical reaction device according to the third embodiment. Note that FIG. 16 illustrates the sectional structures of the stack 10, the third electrode 51, the third catalyst 52, the ion exchange membrane 19b, and a vessel 90.

As shown in FIG. 16, the chemical reaction device according to the third embodiment is different from the first embodiment in that the ion exchange membrane 19b, the third catalyst 52, and the third electrode 51 are formed on the reverse surface of the stack 10 (on the reverse surface of the second catalyst 18), the second electrolytic cell channel 26a is formed in the second electrode 11, and the third electrolytic cell channel 27a is formed in the third electrode 51.

The second electrode 11 physically divides the vessel 90 into a first electrolytic cell 25 and a cell 28.

The first electrolytic cell 25 is located on the side of the obverse surface of the second electrode 11 in the vessel 90, and stores a first electrolyte solution 23a inside so as to immerse the obverse surface (first catalyst 17) of a first electrode 16. The first electrolyte solution 23a is a solution containing, for example, $H_2O$. As the solution, a solution containing an arbitrary electrolyte is usable. The solution preferably promotes an oxidation reaction of $H_2O$. The upper surface of the first electrolytic cell 25 is provided with a window portion made of, for example, glass or acryl with a high light transmittance. Irradiation light enters from above the first electrolytic cell 25.

A tube 22a is connected to the first electrolytic cell 25. The tube 22a injects the first electrolyte solution 23a into the first electrolytic cell 25 or discharges the first electrolyte solution 23a from the first electrolytic cell 25.

The cell 28 is located on the side of the reverse surface of the second electrode 11, and stores the second catalyst 18, the ion exchange membrane 19b, the third catalyst 52, and the third electrode 51. The cell 28 does not store an electrolyte solution inside and is filled with, for example, air.

The second electrode 11 physically divides the vessel 90 into the first electrolytic cell 25 and the cell 28. The reverse surface of the second electrode 11 is arranged on the side of the cell 28 and stored in the cell 28. At this time, the obverse surface of the second electrode 11 is arranged on the side of the first electrolytic cell 25. By forming an insulating layer (not shown) on the obverse surface of the second electrode 11, the second electrode 11 and the first electrolyte solution 23a can electrically be insulated to suppress a reaction between them.

The second electrode 11 has an ion moving path in its exposed portion. The ion moving path is formed from, for example, a plurality of pores extending from the obverse surface to the reverse surface. The pores selectively pass only ions (for example, $H^-$) generated by the oxidation reaction of the first electrode 16 in the first electrolytic cell 25 to the second electrolytic cell channel 26a. The ions passed through the pores are converted into $O_2$, $H_2$, an organic compound, or the like by the reduction reaction of the second electrode 11 in the second electrolytic cell channel 26a.

Each pore need only have a size to pass an ion. For example, the lower limit of the diameter (equivalent circle diameter) of the pore is preferably 0.3 nm or more. An area ratio S1/S2 of a total area S1 of the plurality of pores to an area S2 of an ion permeable member 21a is 0.9 or less, preferably, 0.6 or less so as not to lower the mechanical strength. The pore need not always have a circular shape and may have an elliptic shape, triangular shape, or rectangular shape. The arrangement pattern of the pores is not limited to a rectangular grid and may be a triangular grid or random. Each pore may be filled with an ion exchange membrane 19. Examples of the ion exchange membrane are a cation exchange membrane such as Nafion or Flemion and an anion exchange membrane such as Neosepta or Selemion. Each pore may be filled with a glass filter or agar.

Note that the second electrode 11 may have a plurality of slits extending from the obverse surface to the reverse surface and filled with the ion exchange membrane 19 in place of pores. The slits selectively pass only ions (for example, H⁻) generated by the oxidation reaction of the first electrode 16 in the first electrolytic cell 25 to the second electrolytic cell channel 26a. In place of the pores, a tube may be connected to the outside of the vessel 90 and partially filled with an ion exchange membrane. A valve or the like may be provided in the tube, and an operation of stopping ion movement may be performed by the valve when the chemical reaction device is used as a solar cell.

The second catalyst 18 is formed on the reverse surface of the second electrode 11. The second catalyst 18 is formed so as to come into contact with the ion moving path. The second catalyst 18 is porous and passes the materials of the electrolyte solution, water ($H_2O$), $CO_2$, and ions (for example, H⁻). A gas diffusion layer (not shown) may be formed between the second electrode 11 and the second electrolytic cell channel 26a. The gas diffusion layer is porous and water-repellent. This makes it possible to increase the substance diffusion speed and supply water ($H_2O$) and $CO_2$ to the second catalyst 18 as steam (gas). It is therefore possible to increase the reaction efficiency in the second catalyst 18.

The ion exchange membrane 19b is formed on the reverse surface of the second catalyst 18. The ion exchange membrane 19b selectively passes only ions (for example, H⁻) generated by the oxidation reaction of the third electrode 51 in the third electrolytic cell channel 27a to the second electrolytic cell channel 26a via the second catalyst 18. The ions passed through the ion exchange membrane 19b are converted into $O_2$, $H_2$, an organic compound, or the like by the reduction reaction of the second electrode 11 in the second electrolytic cell channel 26a. Examples of the ion exchange membrane 19b are a cation exchange membrane such as Nafion or Flemion and an anion exchange membrane such as Neosepta or Selemion.

The third catalyst 52 is formed on the reverse surface of the ion exchange membrane 19b. The third catalyst 52 is porous and passes the materials of the electrolyte solution, water ($H_2O$), $CO_2$, and ions (for example, H⁻). A gas diffusion layer (not shown) may be formed between the third electrode 51 and the third electrolytic cell channel 27a. The gas diffusion layer is porous and water-repellent. This makes it possible to increase the substance diffusion speed and supply water ($H_2O$) and $CO_2$ to the third catalyst 52 as steam (gas). It is therefore possible to increase the reaction efficiency in the third catalyst 52.

The third catalyst 52 is provided to increase chemical reactivity (oxidation reactivity) near the obverse surface of the third electrode 51. When an aqueous solution, that is, a solution containing $H_2O$ is used as a third electrolyte solution 23c, the third electrode 51 oxidizes $H_2O$ to generate $O_2$ and H⁻. For this purpose, the third catalyst 52 is made of a material that decreases activation energy to oxidize $H_2O$. In other words, the third catalyst is made of a material that lowers an overvoltage upon oxidizing $H_2O$ and generating $O_2$ and H⁻. Examples of the material are a binary metal oxide such as Mn—O, Ir—O, Ni—O, Co—O, Fe—O, Sn—O, In—O, or Ru—O, ternary metal oxide such as Ni—Co—O, Ni—Fe—O, La—Co—O, Ni—La—O, or Sr—Fe—O, a quaternary metal oxide such as Pb—Ru—Ir—O, or La—Sr—Co—O, and a metal complex such as an Ru complex or an Fe complex. The third catalyst need not always have a membrane shape, and may have a lattice shape, grain shape, or wire shape. The third catalyst may be provided on a gas diffusion layer (not shown), and a chemical reaction may be caused in the gas diffusion layer by imparting conductivity to the gas diffusion layer.

The third electrode 51 is formed on the reverse surface of the third catalyst 52. The third electrode 51 is formed from a metal plate of, for example, Cu, Al, Ti, Ni, Fe, or Ag or an alloy plate of, for example, SUS containing at least one of them. The third electrode 51 may be made of a conductive resin or the like. The third electrode 51 may be formed from a semiconductor substrate such as Si or Ge. The third electrode 51 may be made of carbon or porous carbon.

The second electrolytic cell channel 26a is formed in the second electrode 11. More specifically, the second electrolytic cell channel 26a is formed as a groove portion formed in the reverse surface of the second electrode 11. In other words, the second electrolytic cell channel 26a is formed in the cavity portion at the interface between the second electrode 11 and the second catalyst 18. For this reason, the second electrolytic cell channel 26a is formed in contact with the second electrode 11 and the second catalyst 18. That is, when the second electrolytic cell channel 26a is filled with a second electrolyte solution 23b, the second electrolyte solution 23b comes into contact with the second electrode 11 and the second catalyst 18.

The third electrolytic cell channel 27a is formed in the third electrode 51. More specifically, the third electrolytic cell channel 27a is formed as a groove portion formed in the obverse surface of the third electrode 51. In other words, the third electrolytic cell channel 27a is formed in the cavity portion at the interface between the third electrode 51 and the third catalyst 52. For this reason, the third electrolytic cell channel 27a is formed in contact with the third electrode 51 and the third catalyst 52. That is, when the third electrolytic cell channel 27a is filled with the third electrolyte solution 23c, the third electrolyte solution 23c comes into contact with the third electrode 51 and the third catalyst 52.

An electrolyte solution control unit 61 controls the first electrolyte solution 23a in the first electrolytic cell 25, the second electrolyte solution 23b in the second electrolytic cell channel 26a, and the third electrolyte solution 23c in the third electrolytic cell channel 27a. More specifically, the electrolyte solution control unit 61 measures the amounts of the first electrolyte solution 23a in the first electrolytic cell 25, the second electrolyte solution 23b in the second electrolytic cell channel 26a, and the third electrolyte solution 23c in the third electrolytic cell channel 27a, and controls injection and discharge of the first electrolyte solution 23a by the tube 22a, the second electrolyte solution 23b by a tube (not shown) connected to the second electrolytic cell channel 26a, and the third electrolyte solution 23c by a tube (not shown) connected to the third electrolytic cell channel 27a.

3-2. Operation of Third Embodiment

Figure 17:
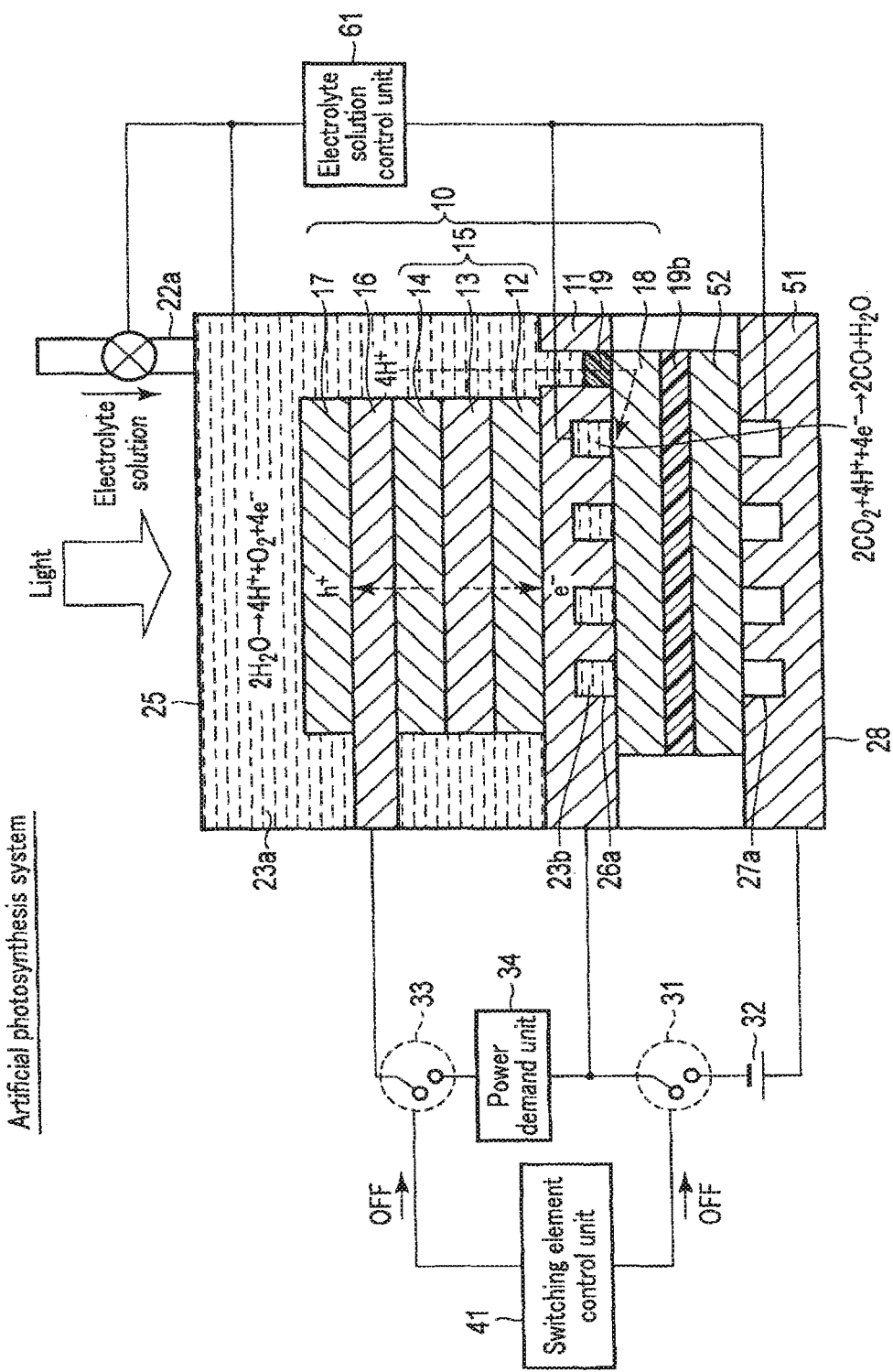
FIG. 17 is a view showing the artificial photosynthesis system operation of the chemical reaction device according to the third embodiment.

FIG. 17 is a view showing the artificial photosynthesis system operation of the chemical reaction device according to the third embodiment. The artificial photosynthesis system is used mainly in a case with surplus power and sunlight energy.

As shown in FIG. 17, when the chemical reaction device is used as the artificial photosynthesis system, a switching element control unit 41 turns off a first switching element 31 and a second switching element 33. The second electrode 11 and the third electrode 51 are thus electrically disconnected via an external power supply 32. In addition, the first electrode 16 and the second electrode 11 are electrically disconnected via a power demand unit 34.

The electrolyte solution control unit 61 controls the amount of the first electrolyte solution 23a in the first electrolytic cell 25 so as to immerse the first electrode 16 in the first electrolyte solution 23a. The first electrolyte solution 23a is thus injected into the first electrolytic cell 25 via the tube 22a, and the first electrolytic cell 25 is filled with the first electrolyte solution 23a. Note that, the first electrolytic cell 25 need not always be filled with the first electrolyte solution 23a, and immersing at least part of the first electrode 16 in the first electrolyte solution 23a suffices.

On the other hand, the electrolyte solution control unit 61 controls the amount of the second electrolyte solution 23b in the second electrolytic cell channel 26a so as to immerse the second electrode 11 in the second electrolyte solution 23b. The second electrolyte solution 23b is thus injected into the second electrolytic cell channel 26a via the tube (not shown), and the second electrolytic cell channel 26a is filled with the second electrolyte solution 23b. Note that the second electrolytic cell channel 26a need not always be filled with the second electrolyte solution 23b, and immersing at least part of the second electrode 11 in the second electrolyte solution 23b suffices.

Note that the third electrolytic cell channel 27a can be either filled with the third electrolyte solution 23c or not.

When light enters from above in this state, a reaction represented by formula (1) occurs near the obverse surface of the first electrode 16 in contact with the first electrolyte solution 23a, and a reaction represented by formula (2) occurs near the reverse surface of the second electrode 11 in contact with the second electrolyte solution 23b.

As indicated by formula (1), near the obverse surface of the first electrode 16, $H_2O$ is oxidized (loses electrons), and $O_2$ and $H^+$ are generated. $H^+$ generated on the side of the first electrode 16 moves to the side of the second electrode 11. More specifically, $H^+$ generated on the side of the first electrode 16 moves into the second electrolytic cell channel 26a via the ion exchange membrane 19 and the porous second catalyst 18.

As indicated by formula (2), near the reverse surface of the second electrode 11 (second electrolytic cell channel 26a), $CO_2$ reacts with $H^+$ that has moved, and CO and $H_2O$ are generated. That is, $CO_2$ is reduced (obtains electrons).

As described above, in the artificial photosynthesis system, electromotive force is generated in the photovoltaic layer 15 by sunlight energy. The electromotive force causes an oxidation reduction reaction (electrolytic reaction) on the obverse surface of the first electrode 16 and the reverse surface of the second electrode 11, and chemical energy is generated. That is, sunlight energy can be converted into chemical energy.

FIG. 18 is a view showing the electrolytic system operation of the chemical reaction device according to the third embodiment. The electrolytic system is used mainly in a case with surplus power but without sunlight energy. For example, the electrolytic system can be used at nighttime.

As shown in FIG. 18, when the chemical reaction device is used as the electrolytic system, the switching element control unit 41 turns on the first switching element 31. The second electrode 11 and the third electrode 51 are thus electrically connected via the external power supply 32. On the other hand, the switching element control unit 41 turns off the second switching element 33. The first electrode 16 and the second electrode 11 are thus electrically disconnected via the power demand unit 34.

The electrolyte solution control unit 61 controls the amount of the second electrolyte solution 23b in the second electrolytic cell channel 26a so as to immerse the second electrode 11 in the second electrolyte solution 23b. The second electrolyte solution 23b is thus injected into the second electrolytic cell channel 26a via the tube (not shown), and the second electrolytic cell channel 26a is filled with the second electrolyte solution 23b. Note that the second electrolytic cell channel 26a need not always be filled with the second electrolyte solution 23b, and immersing at least part of the second electrode 11 in the second electrolyte solution 23b suffices.

On the other hand, the electrolyte solution control unit 61 controls the amount of the third electrolyte solution 23c in the third electrolytic cell channel 27a so as to immerse the third electrode 51 in the third electrolyte solution 23c. The third electrolyte solution 23c is thus injected into the third electrolytic cell channel 27a via the tube (not shown), and the third electrolytic cell channel 27a is filled with the third electrolyte solution 23c. Note that the third electrolytic cell channel 27a need not always be filled with the third electrolyte solution 23c, and immersing at least part of the second electrode 11 in the second electrolyte solution 23b suffices.

Note that the first electrolytic cell 25 can be either filled with the first electrolyte solution 23a or not.

When electromotive force is generated in the external power supply 32 in this state, a reaction represented by formula (1) occurs near the obverse surface of the third electrode 51 in contact with the third electrolyte solution 23c, and a reaction represented by formula (2) occurs near the reverse surface of the second electrode 11 in contact with the second electrolyte solution 23b.

As indicated by formula (1), near the obverse surface of the third electrode 51 (third electrolytic cell channel 27a), $H_2O$ is oxidized (loses electrons), and $O_2$ and $H^+$ are generated. $H^+$ generated on the side of the third electrode 51 moves to the side of the second electrode 11. More specifically, $H^+$ generated on the side of the third electrode 51 moves into the second electrolytic cell channel 26a via the porous third catalyst 52, the ion exchange membrane 19, and the porous second catalyst 18.

At this time, since the third electrode 51 and the second electrode 11 are formed so as to face each other, the distance between them is relatively short. For this reason, the distance that $H^+$ moves from the third electrode 51 to the second electrode 11 is short. It is therefore possible to efficiently diffuse $H^+$ from the third electrode 51 to the second electrode 11.

As indicated by formula (2), near the reverse surface of the second electrode 11 (second electrolytic cell channel 26a), $CO_2$ reacts with $H^+$ that has moved, and CO and $H_2O$ are generated. That is, $CO_2$ is reduced (obtains electrons).

As described above, in the electrolytic system, electromotive force is generated in the external power supply 32 by the electric energy of surplus power. The electromotive force causes an oxidation reduction reaction (electrolytic reaction), and chemical energy is generated. That is, electric energy can be converted into chemical energy.

Note that the artificial photosynthesis system and the electrolytic system may simultaneously cause reactions. That is, the first electrolytic cell 25 is filled with the first electrolyte solution 23a, the second electrolytic cell channel 26a is filled with the second electrolyte solution 23b, and the third electrolytic cell channel 27a is filled with the third electrolyte solution 23c. The device is irradiated with light, and the switching element 31 is turned on. This can cause a reaction in each of the first electrolytic cell 25, the second electrolytic cell channel 26a, and the third electrolytic cell channel 27a in a state in which the first electrode 16 and the third electrode 51 are connected in parallel to the second electrode 11.

FIG. 19 is a view showing the solar cell operation of the chemical reaction device according to the third embodiment. FIG. 20 is a view showing a modification of the solar cell operation of the chemical reaction device according to the third embodiment. The solar cell is used mainly in a case without surplus power.

As shown FIG. 19, when the chemical reaction device is used as the solar cell, the switching element control unit 41 turns off the first switching element 31. The second electrode 11 and the third electrode 51 are thus electrically disconnected via the external power supply 32. On the other hand, the switching element control unit 41 turns on the second switching element 33. The first electrode 16 and the second electrode 11 are thus electrically connected via the power demand unit 34.

At this time, it is preferable that ions do not move between the first electrode 16 and the second electrode 11 via the first electrolyte solution 23a or second electrolyte solution 23b. That is, preferably, no current flows via the first electrolyte solution 23a or second electrolyte solution 23b. This is because discharge to the power demand unit 34 occurs at the same time as power generation by the photovoltaic layer 15. To do this, the electrolyte solution control unit 61 controls the amount of the first electrolyte solution 23a in the first electrolytic cell 25 so as not to immerse the first electrode 16 in the first electrolyte solution 23a. Alternatively, the electrolyte solution control unit 61 controls the amount of the second electrolyte solution 23b in the second electrolytic cell channel 26a so as not to immerse the second electrode 11 in the second electrolyte solution 23b. The first electrolyte solution 23a is thus discharged from the first electrolytic cell 25 via the tube 22a, and the first electrolytic cell 25 is filled with air. Alternatively, the second electrolyte solution 23b is discharged from the second electrolytic cell 26a via the tube (not shown), and the second electrolytic cell channel 26a is filled with air.

Note that the first electrolytic cell 25 need not always be filled with air, and prohibiting at least part of the first electrode 16 from being immersed in the first electrolyte solution 23a suffices. At this time, as shown in FIG. 20, the first electrolytic cell 25 may partially be filled with a gas (for example, $O_2$) generated by the above-described artificial photosynthesis system or electrolytic system. In this case, the first electrolyte solution 23a need not be discharged from the first electrolytic cell 25 via the tube 22a. That is, it is unnecessary to use a pump and the like provided on the tube 22a, and energy loss can be reduced. In this case, the first electrode 16 is preferably arranged on the side opposite to the gravity. Additionally, the electrolytic cell 25 may be filled with a substance of low conductivity, as describe above. The electrolytic cell 25 may be divided by the photovoltaic layer 15, the first electrode 16, the first catalyst 17, or the like, and the outside of the electrolytic cell 25 may be connected by a tube (not shown) or the like. The tube may be blocked by a valve or the like.

When the second electrode 11 is made of a conductive material, an insulating layer (not shown) may be provided (at the contact point) between the second electrode 11 and the second catalyst 18. The second electrolyte solution 23b in the second electrolytic cell channel 26a is discharged, and the second electrolytic cell channel 26a is filled with an insulating liquid or gas. This obviates the necessity of discharging the first electrolyte solution 23a in the first electrolytic cell 25. It is therefore possible to improve the energy efficiency without cumbersomeness in injecting/discharging the first electrolyte solution 23a.

When entering from above in this state, irradiation light passes through the first electrode 16 and reaches the photovoltaic layer 15. Upon absorbing the light, the photovoltaic layer 15 generates electrons and holes as counterparts, and separates them. That is, in each of the photovoltaic layers (a first photovoltaic layer 12, a second photovoltaic layer 13, and a third photovoltaic layer 14), the electrons moves to the side of the n-type semiconductor layer (the side of the second electrode 11), and holes generated as the counterparts of the electrons move to the side of the p-type semiconductor layer (the side of the first electrode 16) so that charge separation occurs. Electromotive force is thus generated in the photovoltaic layer 15. Power can be supplied to the power demand unit 34 by the electromotive force generated by the photovoltaic layer 15.

As described above, in the solar cell, electromotive force is generated in the photovoltaic layer 15 by sunlight energy. By the electromotive force, electric energy is generated. That is, sunlight energy can be converted into electric energy.

3-3. Effects of Third Embodiment

According to the third embodiment, the same effects as in the second embodiment can be obtained.

Additionally, according to the third embodiment, the third catalyst 52 and the third electrode 51 are formed on the ion exchange membrane 19b on the reverse surface of the stack 10 (second catalyst 18). The second electrolytic cell channel 26a is formed inside the second electrode 11, and the third electrolytic cell channel 27a is formed inside the third electrode 51. The second electrolytic cell channel 26a and the third electrolytic cell channel 27a according to the third embodiment are formed to have a capacity smaller than that of the second electrolytic cell 26 and the third electrolytic cell 27 according to the second embodiment. It is therefore possible to collect the product generated in the second electrolytic cell channel 26a and the third electrolytic cell channel 27a more easily than in the second embodiment.

3-4. Modification of Third Embodiment

FIG. 21 is a schematic view showing the arrangement of the first modification of the chemical reaction device according to the third embodiment.

As shown in FIG. 21, in the first modification of the chemical reaction device according to the third embodiment, a sensor unit 42 is electrically connected between the first electrode 16 and the second electrode 11, and a sensor unit 43 is electrically connected between the second electrode 11 and the third electrode 51.

The sensor unit 42 is electrically connected between the second electrode 11 and the third electrode 51 via the switching element 31 and the external power supply 32. In other words, the first switching element 31 is formed between the sensor unit 42 and the second electrode 11 or third electrode 51. When the first switching element 31 is turned on, the second electrode 11 and the third electrode 51 are electrically connected via the external power supply 32 and the sensor unit 42. On the other hand, when the first switching element 31 is turned off, the second electrode 11 and the third electrode 51 are electrically disconnected via the external power supply 32 and the sensor unit 42. That is, the sensor unit 42 functions when the chemical reaction device is mainly used as an electrolytic system.

The sensor unit 43 is electrically connected between the first electrode 16 and the second electrode 11 via a third switching element 35. In other words, the third switching element 35 is formed between the sensor unit 43 and the first electrode 16 or second electrode 11. When the third switching element 35 is turned on, the first electrode 16 and the second electrode 11 are electrically connected via the sensor unit 43. On the other hand, when the third switching element 35 is turned off, the first electrode 16 and the second electrode 11 are electrically disconnected via the sensor unit 43. That is, the sensor unit 43 functions when the chemical reaction device is mainly used as an artificial photosynthesis system.

In the case of, for example, the electrolytic system, using the electromotive force of the external power supply 32, the sensor unit 42 captures electrical signals obtained by the reaction between the second electrolyte solution 23b and the second electrode 11 and the reaction between the third electrolyte solution 23c and the third electrode 51. In the case of the electrolytic system, the sensor unit 42 thus measures pH of the second electrolyte solution 23b and the third electrolyte solution 23c, the concentrations of the second electrolyte solution 23b and the third electrolyte solution 23c, the compositions of the second electrolyte solution 23b and the third electrolyte solution 23c, the pressures in the second electrolytic cell channel 26a and the third electrolytic cell channel 27a, the temperatures in the second electrolytic cell channel 26a and the third electrolytic cell channel 27a, the light intensity, and the like.

In the case of, for example, the artificial photosynthesis system, using the electromotive force of the photovoltaic layer 15, the sensor unit 43 captures electrical signals obtained by the reaction between the first electrolyte solution 23a and the first electrode 16 and the reaction between the second electrolyte solution 23b and the second electrode 11. In the case of the artificial photosynthesis system, the sensor unit 43 thus measures pH of the first electrolyte solution 23a and the second electrolyte solution 23b, the concentrations of the first electrolyte solution 23a and the second electrolyte solution 23b, the compositions of the first electrolyte solution 23a and the second electrolyte solution 23b, the pressures in the first electrolytic cell 25 and the second electrolytic cell channel 26a, the temperatures in the first electrolytic cell 25 and the second electrolytic cell channel 26a, the light intensity, and the like. The sensor unit 43 can operate without a power supply because it uses the electromotive force of the photovoltaic layer 15.

Note that when the chemical reaction device is used as an artificial photosynthesis system, the sensor 43 may be unable to function by the electromotive force of the photovoltaic layer 15 because of a low light intensity. In this case, the sensor unit 42 may temporarily be caused to function by the external power supply 32 to measure various requirements. This also applies to a case where the chemical reaction device is used as an electrolytic system. That is, when the chemical reaction device is used as an electrolytic system, the sensor unit 43 may temporarily be caused to function by the electromotive force of the photovoltaic layer 15 to measure various requirements.

In the first modification, the sensor units 42 and 43 measure pH of the first electrolyte solution 23a, the second electrolyte solution 23b, and the third electrolyte solution 23c, the concentrations of the first electrolyte solution 23a, the second electrolyte solution 23b, and the third electrolyte solution 23c, the compositions of the first electrolyte solution 23a, the second electrolyte solution 23b, and the third electrolyte solution 23c, the pressures in the first electrolytic cell 25, the second electrolytic cell channel 26a, and the third electrolytic cell channel 27a, the temperatures in the first electrolytic cell 25, the second electrolytic cell channel 26a, and the third electrolytic cell channel 27a, the light intensity, and the like. It is therefore possible to appropriately adjust the conditions of the electrolyte solutions and the electrolytic cells to promote the electrolytic reaction.

While certain embodiments of the inventions have been described, these embodiments have been presented by way of examples only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The appended claims and their equivalents are intended to cover such forms or modifications as would fall within the scope and spirit of the inventions.

What is claim is:

1. A method of operating a chemical reaction device, the method comprising:
   (1) determining presence of surplus power more than a demand; and
   (2) determining presence of solar energy,
   wherein:
   if it is determined in the determining (1) that the surplus power is not present, electrodes in an electrolytic cell are prohibited from being immersed in an electrolyte solution, and the chemical reaction device is caused to operate as a first system using electromotive force of a photovoltaic layer including a diode characteristic; and
   if it is determined in the determining (1) that the surplus power is present, the second step is performed so that, in an absence of the solar energy, the electrodes in the electrolytic cell are immersed in the electrolyte solution, and the chemical reaction device is caused to operate as a second system to generate chemical energy using the surplus power, and
   in the presence of the solar energy, the electrodes in the electrolytic cell are immersed in the electrolyte solution, and the chemical reaction device is caused to operate as a third system to generate chemical energy using the electromotive force of the photovoltaic layer.

2. The method of claim 1, further comprising:
   filling the electrolytic cell with gas or a nonconductive liquid, when the chemical reaction device is caused to operate as the first system.

3. The method of claim 1, further comprising:
   filling the electrolytic cell with gas generated by the second system or the third system, when the chemical reaction device is caused to operate as the first system.

4. The method of claim 1, wherein:
   the electrodes include a first electrode and a second electrode, the first electrode arranged on a light irradiation side and the second electrode arranged on a side opposite to the light irradiation side;
   the photovoltaic layer is electrically connected to the first electrode and the second electrode;
   the chemical reaction device includes:
      an external power supply electrically connected between the first electrode and the second electrode via a first switching element,
      a power demand unit electrically connected between the first electrode and the second electrode via a second switching element in parallel with the external power supply, and a switching element control unit configured to on/off-control the first switching element and the second switching element; and the switching element control unit on/off-controls the first switching element and the second switching element so that the chemical reaction device operates as at least one of the first system, the second system, and the third system.

5. The method of claim 4, wherein, in a case without surplus power more than a demand of the power demand unit, the switching element control unit turns off the first switching element and turns on the second switching element so that the chemical reaction device operates as the first system.

6. The method of claim 4, wherein, in a case with surplus power more than a demand of the power demand unit and without light energy, the switching element control unit turns off the second switching element and turns on the first switching element so that the chemical reaction device operates as the second system.

7. The method of claim 4, wherein, in a case with surplus power more than a demand of the power demand unit and with light energy, the switching element control unit turns off the first switching element and the second switching element so that the chemical reaction device operates as the third system.

8. The method of claim 4, wherein the chemical reaction device comprises a sensor configured to operate by electromotive force of the external power supply or electromotive force of the photovoltaic layer.

9. The method of claim 8, wherein the sensor is configured to measure at least one of a pH of the electrolyte solution, a concentration of the electrolyte solution, a composition of the electrolyte solution, a pressure in the electrolytic cell, a temperature in the electrolytic cell, and a light intensity.

* * * * *